United States Patent
Livshits et al.

(10) Patent No.: US 11,003,476 B2
(45) Date of Patent: *May 11, 2021

(54) ENTITY DATABASE HISTORICAL DATA

(71) Applicant: Nutanix, Inc., San Jose, CA (US)

(72) Inventors: Artem Yevgenyevich Livshits, Bellevue, WA (US); Ming Chen, Union City, CA (US); Mohan Maturi, San Jose, CA (US); Rahul Singh, Mountain View, CA (US); Ramesh U. Chandra, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 751 days.

This patent is subject to a terminal disclaimer.

(21) Appl. No.: 15/423,477

(22) Filed: Feb. 2, 2017

(65) Prior Publication Data

US 2017/0235772 A1 Aug. 17, 2017

Related U.S. Application Data

(60) Provisional application No. 62/294,980, filed on Feb. 12, 2016.

(51) Int. Cl.
*G06F 9/455* (2018.01)
*G06F 16/26* (2019.01)
(Continued)

(52) U.S. Cl.
CPC .......... *G06F 9/45558* (2013.01); *G06F 11/14* (2013.01); *G06F 11/2094* (2013.01); *G06F 16/00* (2019.01); *G06F 16/212* (2019.01);
*G06F 16/219* (2019.01); *G06F 16/2358* (2019.01); *G06F 16/2379* (2019.01);
(Continued)

(58) Field of Classification Search
None
See application file for complete search history.

(56) References Cited

U.S. PATENT DOCUMENTS 6,011,537 A 1/2000 Slotznick
6,031,533 A 2/2000 Peddada et al.
(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Amresh Singh
(74) *Attorney, Agent, or Firm* — Foley & Lardner LLP

(57) ABSTRACT

In one embodiment, a computing device accesses an entity database storing information about entities in a virtualization environment. Each of the entities is associated with a single entity type and a shard. The shard further corresponds to the single entity type. The computing device determines an entity trail for the single shard, based on a modification history for one or more of the entities associated with the shard. The entity trail is divided into a plurality of time segments. The computing device receives an update from a client device indicating an update to an entity that is associated with the shard, and a client timestamp. The computing device selects a time segment corresponding to the client timestamp, and updates that portion of the entity trail with the client update.

20 Claims, 19 Drawing Sheets

(51) Int. Cl.

| | |
|---|---|
| G06F 16/27 | (2019.01) |
| G06F 16/21 | (2019.01) |
| G06F 16/28 | (2019.01) |
| G06F 16/23 | (2019.01) |
| G06F 16/9535 | (2019.01) |
| G06F 16/2457 | (2019.01) |
| H04L 29/08 | (2006.01) |
| H04W 4/60 | (2018.01) |
| G06F 11/14 | (2006.01) |
| G06F 11/20 | (2006.01) |
| G06F 16/00 | (2019.01) |
| G06F 3/0484 | (2013.01) |

(52) U.S. Cl.
CPC ........ *G06F 16/24578* (2019.01); *G06F 16/26* (2019.01); *G06F 16/27* (2019.01); *G06F 16/285* (2019.01); *G06F 16/9535* (2019.01); *H04L 67/10* (2013.01); *H04L 67/1097* (2013.01); *H04W 4/60* (2018.02); *G06F 3/04842* (2013.01); *G06F 3/04845* (2013.01); *G06F 2009/45579* (2013.01); *G06F 2009/45583* (2013.01); *G06F 2201/835* (2013.01)

(56) References Cited

U.S. PATENT DOCUMENTS

| | | | |
|---|---|---|---|
| 6,098,157 A | 8/2000 | Hsu et al. | |
| 7,693,753 B1 | 4/2010 | Purdy | |
| 7,725,671 B2 | 5/2010 | Prahlad et al. | |
| 7,809,833 B2 | 10/2010 | Shen et al. | |
| 7,840,533 B2 | 11/2010 | Prahlad et al. | |
| 8,447,728 B2 | 5/2013 | Prahlad et al. | |
| 8,549,518 B1 | 10/2013 | Aron et al. | |
| 8,601,473 B1 | 12/2013 | Aron et al. | |
| 8,621,569 B1 | 12/2013 | Ewing | |
| 8,634,330 B2 | 1/2014 | Ganapathy et al. | |
| 8,671,176 B1 | 3/2014 | Kharitonov et al. | |
| 8,762,335 B2 | 6/2014 | Prahlad et al. | |
| 8,850,130 B1 | 9/2014 | Aron et al. | |
| 8,863,124 B1 | 10/2014 | Aron et al. | |
| 8,935,248 B2* | 1/2015 | Atkins | G06F 9/5033 |
| | | | 707/737 |
| 9,003,141 B2 | 4/2015 | Nielsen et al. | |
| 9,134,992 B2 | 9/2015 | Wong et al. | |
| 9,189,284 B2 | 11/2015 | Collins et al. | |
| 9,231,988 B2 | 1/2016 | Holt et al. | |
| 9,239,820 B1 | 1/2016 | Marks et al. | |
| 9,268,590 B2 | 2/2016 | Du et al. | |
| 9,317,452 B1 | 4/2016 | Forschmiedt et al. | |
| 9,407,572 B2 | 8/2016 | Ferris | |
| 9,420,004 B2 | 8/2016 | Palshikar et al. | |
| 9,424,545 B1 | 8/2016 | Lee | |
| 9,740,723 B2 | 8/2017 | Prahlad et al. | |
| 9,767,197 B1 | 9/2017 | Agarwal et al. | |
| 9,772,866 B1 | 9/2017 | Aron et al. | |
| 10,210,048 B2 | 2/2019 | Sancheti | |
| 10,248,618 B1 | 4/2019 | Gaurav et al. | |
| 10,248,657 B2 | 4/2019 | Prahlad et al. | |
| 2002/0054152 A1 | 5/2002 | Palaniappan et al. | |
| 2002/0129136 A1 | 9/2002 | Matharu | |
| 2003/0058277 A1 | 3/2003 | Bowman-Amuah | |
| 2003/0110262 A1 | 6/2003 | Hasan et al. | |
| 2003/0120710 A1 | 6/2003 | Pulsipher et al. | |
| 2004/0177090 A1 | 9/2004 | Corbett-Clark | |
| 2004/0215430 A1 | 10/2004 | Huddleston et al. | |
| 2005/0149501 A1 | 7/2005 | Barrett | |
| 2005/0283753 A1 | 12/2005 | Ho et al. | |
| 2005/0287353 A1 | 12/2005 | Trogolo | |
| 2006/0010101 A1 | 1/2006 | Suzuki et al. | |
| 2006/0067252 A1 | 3/2006 | John et al. | |
| 2006/0259592 A1 | 11/2006 | Angeline | |
| 2007/0043550 A1 | 2/2007 | Tzruya | |
| 2007/0106748 A1 | 5/2007 | Jakobsson et al. | |
| 2008/0015823 A1 | 1/2008 | Arnold et al. | |
| 2008/0040661 A1 | 2/2008 | Curtis et al. | |
| 2008/0091800 A1 | 4/2008 | Sorrentino et al. | |
| 2008/0126856 A1 | 5/2008 | Levidow et al. | |
| 2008/0177839 A1 | 7/2008 | Chang et al. | |
| 2009/0019436 A1 | 1/2009 | Hartz et al. | |
| 2009/0077623 A1 | 3/2009 | Baum et al. | |
| 2009/0150851 A1 | 6/2009 | Boer et al. | |
| 2009/0177998 A1 | 7/2009 | Barrios et al. | |
| 2009/0241104 A1 | 9/2009 | Amiga et al. | |
| 2009/0282333 A1 | 11/2009 | Olsen et al. | |
| 2009/0288084 A1* | 11/2009 | Astete | G06Q 30/0601 |
| | | | 718/1 |
| 2010/0077362 A1 | 3/2010 | Allred et al. | |
| 2010/0131264 A1 | 5/2010 | Ljolje et al. | |
| 2010/0269152 A1 | 10/2010 | Pahlavan et al. | |
| 2011/0023031 A1 | 1/2011 | Bonola et al. | |
| 2011/0035802 A1 | 2/2011 | Arajujo et al. | |
| 2011/0087874 A1 | 4/2011 | Timashev et al. | |
| 2011/0154338 A1 | 6/2011 | Ramanathaiah et al. | |
| 2011/0209047 A1 | 8/2011 | Olsen et al. | |
| 2011/0238817 A1 | 9/2011 | Okita et al. | |
| 2011/0252117 A1 | 10/2011 | Sng et al. | |
| 2011/0277027 A1 | 11/2011 | Hayton et al. | |
| 2012/0011509 A1 | 1/2012 | Husain | |
| 2012/0047130 A1 | 2/2012 | Perez et al. | |
| 2012/0054265 A1 | 3/2012 | Kazerani et al. | |
| 2012/0092277 A1 | 4/2012 | Momchilov | |
| 2012/0117497 A1 | 5/2012 | Uola et al. | |
| 2012/0124593 A1* | 5/2012 | Walsh | G06Q 10/00 |
| | | | 719/313 |
| 2012/0144391 A1 | 6/2012 | Ueda | |
| 2012/0163206 A1 | 6/2012 | Leung et al. | |
| 2012/0284713 A1 | 11/2012 | Ostermeyer et al. | |
| 2012/0297179 A1 | 11/2012 | Lirbank et al. | |
| 2012/0317491 A1 | 12/2012 | Wong et al. | |
| 2013/0031094 A1* | 1/2013 | Kozak | G06F 16/355 |
| | | | 707/737 |
| 2013/0055092 A1 | 2/2013 | Cannon et al. | |
| 2013/0055247 A1 | 2/2013 | Hiltgen et al. | |
| 2013/0117359 A1 | 5/2013 | Husain et al. | |
| 2013/0198133 A1 | 8/2013 | Lee et al. | |
| 2013/0247133 A1 | 9/2013 | Price et al. | |
| 2013/0307854 A1 | 11/2013 | Nora et al. | |
| 2014/0020083 A1 | 1/2014 | Fetik | |
| 2014/0115250 A1 | 4/2014 | Kottomtharayil et al. | |
| 2014/0149793 A1 | 5/2014 | Zaslavsky et al. | |
| 2014/0172803 A1 | 6/2014 | Diaconu et al. | |
| 2014/0188899 A1 | 7/2014 | Whitnah et al. | |
| 2014/0189685 A1 | 7/2014 | Kripalani | |
| 2014/0214922 A1 | 7/2014 | Kim et al. | |
| 2014/0215279 A1 | 7/2014 | Houseman et al. | |
| 2014/0282543 A1 | 9/2014 | Ignatchenko et al. | |
| 2014/0304407 A1 | 10/2014 | Moon | |
| 2014/0304713 A1 | 10/2014 | Olsson et al. | |
| 2014/0325036 A1 | 10/2014 | Jahanbanifar et al. | |
| 2014/0337834 A1 | 11/2014 | Adogla | |
| 2014/0365531 A1 | 12/2014 | Soundararajan et al. | |
| 2015/0082179 A1 | 3/2015 | Ayanam et al. | |
| 2015/0113528 A1 | 4/2015 | Kim et al. | |
| 2015/0121369 A1 | 4/2015 | Thankappan et al. | |
| 2015/0127807 A1 | 5/2015 | Billore et al. | |
| 2015/0135255 A1* | 5/2015 | Theimer | H04L 67/1004 |
| | | | 726/1 |
| 2015/0163206 A1 | 6/2015 | McCarthy et al. | |
| 2015/0220080 A1 | 8/2015 | Nixon et al. | |
| 2015/0256475 A1 | 9/2015 | Suman et al. | |
| 2015/0295992 A1 | 10/2015 | Kruglick | |
| 2015/0297776 A1 | 10/2015 | Conroy et al. | |
| 2015/0350446 A1 | 12/2015 | Glass et al. | |
| 2015/0356773 A1 | 12/2015 | Kumar et al. | |
| 2015/0363190 A1 | 12/2015 | Bhatia et al. | |
| 2016/0062789 A1 | 3/2016 | Hiltgen et al. | |
| 2016/0179566 A1 | 6/2016 | Chawla et al. | |
| 2016/0261564 A1 | 9/2016 | Foxhoven et al. | |
| 2016/0337426 A1 | 11/2016 | Shribman et al. | |
| 2016/0359680 A1 | 12/2016 | Parandehgheibi et al. | |
| 2016/0378554 A1 | 12/2016 | Gummaraju et al. | |

(56) References Cited

U.S. PATENT DOCUMENTS

| | | |
|---|---|---|
| 2017/0109217 A1 | 4/2017 | Raman et al. |
| 2017/0139997 A1 | 5/2017 | Arasan et al. |
| 2017/0208138 A1 | 7/2017 | Baxter |
| 2017/0235817 A1 | 8/2017 | Deodhar et al. |
| 2017/0299645 A1 | 10/2017 | Wang |
| 2019/0349254 A1 | 11/2019 | Nolan et al. |
| 2019/0349426 A1 | 11/2019 | Smith et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
"IBM Tivoli Storage Manager for Linux," published on Apr. 2003, [online] http://publib.boulder.ibm.com/tividd/td/ITSML/GC23-4691-01/en_US/HTML/anrlrf51225.htm (Year: 2003), 17 pages.
Russ, "Efficient caching of versioned JavaScript, CSS and image assets for fun and profit," published on May 18, 2009, http://webarchive.org/web/20120518020237/http://2tap.com/2009/05/08/efficient-caching-of-versioned-javascript-css-and-image-assets-for-fun-and-profit/ (Year: 2009), 6 pages.
Wikipedia, "OAuth," Nov. 12, 2017, 8 pages.

\* cited by examiner

ENTITY DATABASE HISTORICAL DATA

PRIORITY

This application claims the benefit, under 35 U.S.C. § 119(e), of U.S. Provisional Patent Application No. 62/294,980, filed 12 Feb. 2016, which is incorporated herein by reference.

TECHNICAL FIELD

This disclosure relates generally to virtualization environments.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical computing devices, and can result in reduced redundancies and better resource cost management.

Furthermore, certain virtualization environments may not only utilize the processing power of the physical computing devices but also aggregate storage capacity across the individual physical computing devices to create a logical storage pool, wherein the data is distributed across the physical computing devices, yet appears to the virtual machines to be part of the system that the virtual machine is hosted on. Such systems may utilize metadata, which may be distributed and replicated any number of times across the system, to locate specific data within the logical storage pool. These systems are commonly referred to as clustered systems, wherein the resources of the group are pooled to provide logically combined, but physically separate systems.

SUMMARY OF PARTICULAR EMBODIMENTS

Embodiments of the present invention introduce a user interface to display information about entities, their relationships, attributes, and stats in a virtualization environment. A virtualization environment may include a plurality of host machines, each of the host machines comprising a hypervisor, one or more user virtual machines (UVMs) and a virtual machine controller. The virtualization environment further includes one or more virtual disks comprising a plurality of storage devices, the one or more virtual disks being accessible by the virtual machine controllers. The virtual machine controllers conduct I/O transactions with the one or more virtual disks. A system for managing the virtualization environment is operable to store an entity-relationship graph representing elements in the virtualization environment. Each of the elements is represented by an entity-type node in the entity-relationship graph, and relationships between the elements are represented by edges between the nodes.

BRIEF DESCRIPTION OF THE DRAWINGS

FIG. 8 shows an example client user interface illustrating selection of virtual machines in a virtualization environment according to some embodiments.

FIG. 9 shows an example client user interface illustrating filtering of entities and attributes in a search feature according to some embodiments.

FIG. 13 illustrates sample statistics for the overall virtualization environment that may be maintained by the entity database according to some embodiments.

DESCRIPTION OF EXAMPLE EMBODIMENTS

Figure 1A:
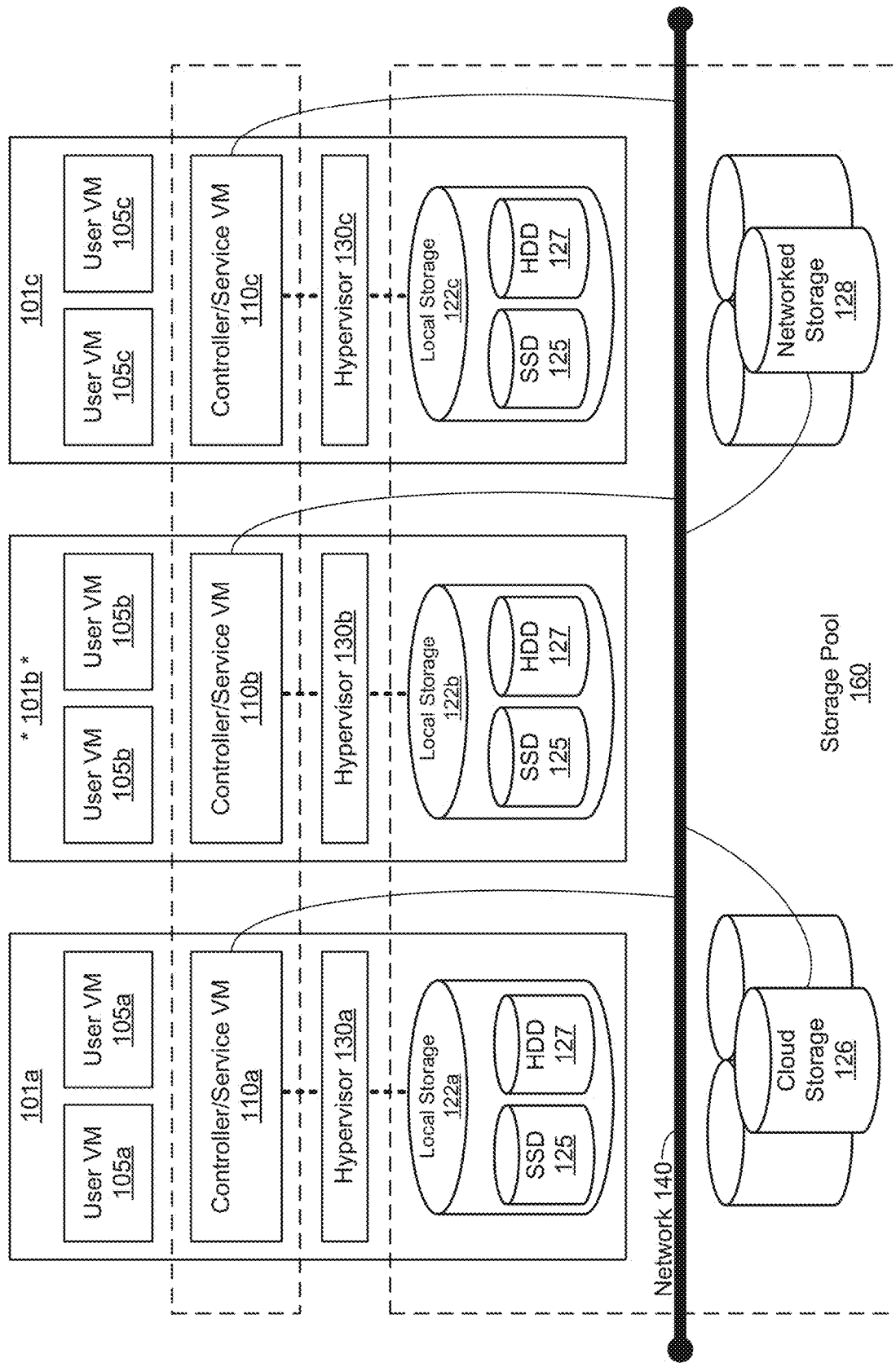
FIG. 1A illustrates a clustered virtualization environment according to some embodiments.

FIG. 1A illustrates a clustered virtualization system 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs). In particular embodiments, the virtualization environment may include two or more clusters.

Each host machine 101a-c may run virtualization software, such as VMWARE ESX(I), MICROSOFT HYPER-V, REDHAT KVM, or NUTANIX AHV. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization system 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
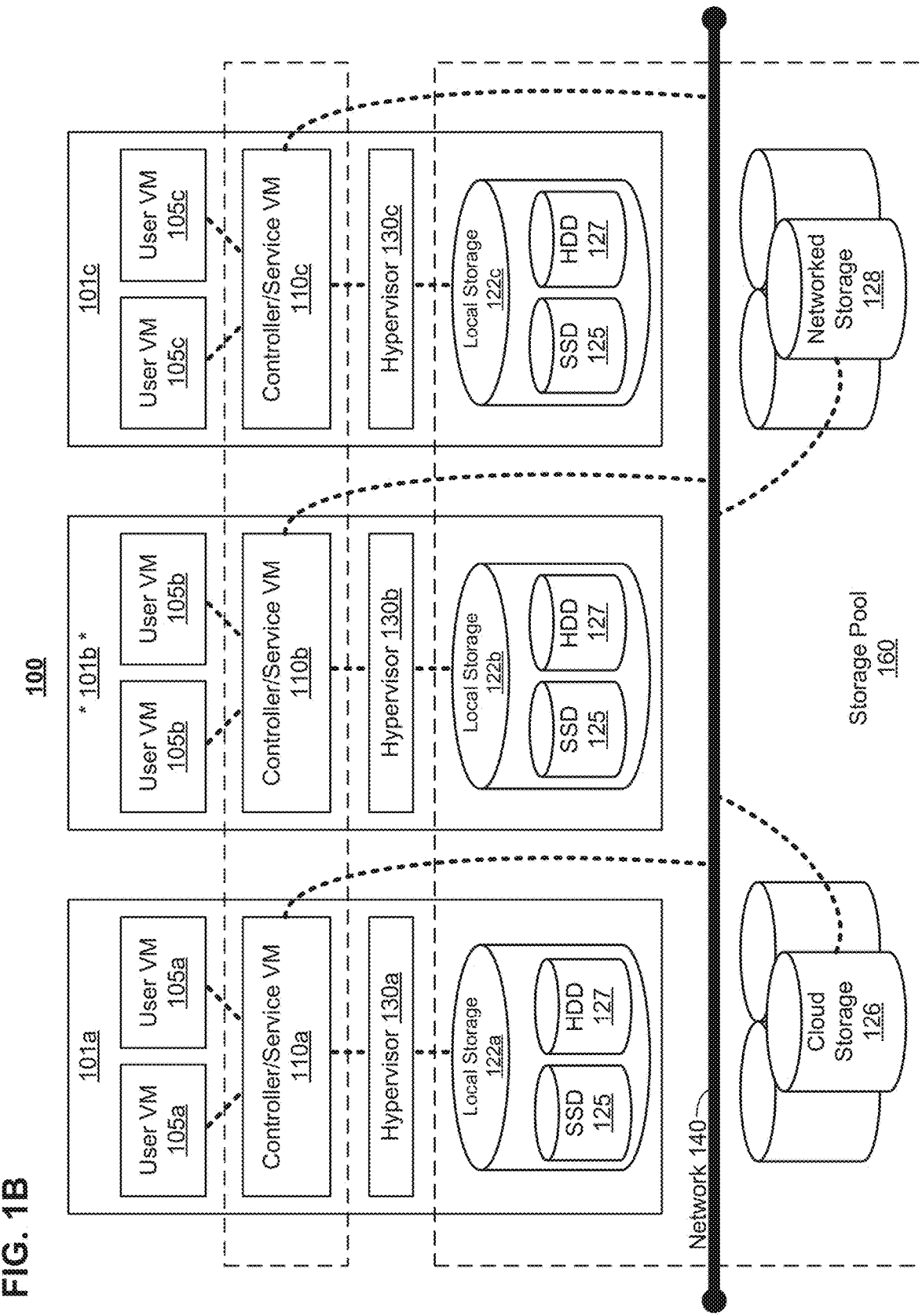
FIG. 1B illustrates data flow within a clustered virtualization environment according to some embodiments.

FIG. 1B illustrates data flow within an example clustered virtualization system 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor running on the same host machine as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 1700 may be used to implement a host machine 101.

In particular embodiments, the clustered virtualization environment may include a distributed entity database for storing datacenter entities and the relationships between them, as represented by an entity-relationship graph. An entity database may support such an entity-relationship model by storing information related to the entity-relationship graph, such as entities, entity relationships, and time series information and statistics. The database may be sharded (a.k.a. distributed) across multiple nodes, and may have a query model optimized for the entity-relationship model that supports querying current and historical data, queries for keyword searches, watches for notifying clients on entity updates, and synchronization of data between database instances.

Figure 2:
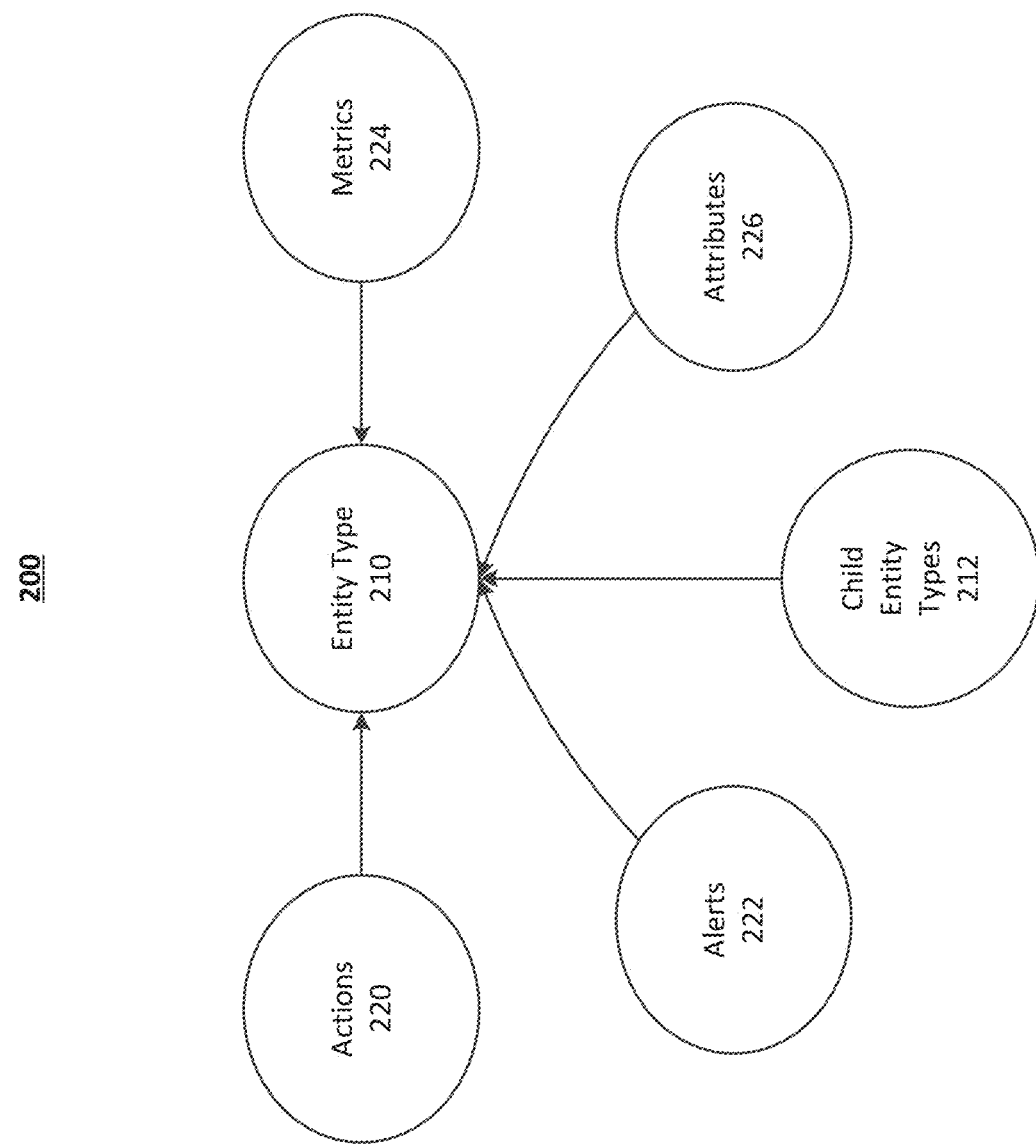
FIG. 2 illustrates the basic pattern of an entity relationship graph according to some embodiments.

FIG. 2 illustrates the basic pattern of an entity-relationship graph 200, which may comprise an entity-type node 210 (e.g., a parent entity-type node) connected to a child entity-type node 212. In addition, a plurality of activity-type nodes may be connected to entity-type node 210, including an action-type node 220, an alert-type node 222, a metrics-type node 224, and an attributes-type node 226. As an example and not by way of limitation, each entity-type node (e.g., entity type node 210, child entity-type node 212, etc.) is connected to at least one of the activity-type nodes. For simplicity, only one node is shown in the basic structure of the entity-relationship graph 200, but this disclosure contemplates that each node type can comprise one or more nodes of that node type.

The schema of an entity-relationship graph (including relationships between entities) may be defined at runtime, and the entity-relationship graph may dynamically evolve as conditions change. As illustrated, each entity may have its own properties. In particular embodiments, each entity may also inherit properties from related entities (e.g., inheriting available actions from a parent). In particular embodiments, certain properties of an entity may represent the aggregated properties of its child entities (e.g., metrics data for a cluster entity may comprise the aggregated metrics data from its child entity nodes). Values for different attributes and/or metrics data for an entity may be generated by different sources (e.g., different services running in the virtualization environment and/or other entities). Particular entities may retain historical data relating to changes in its properties and/or metrics data (e.g., tracked statistical information). Such historical data may be retained together with time-stamp information so that the evolving state of the virtualization environment is captured in an entity trail, as discussed further in relation to FIG. 5.

Figure 3A:
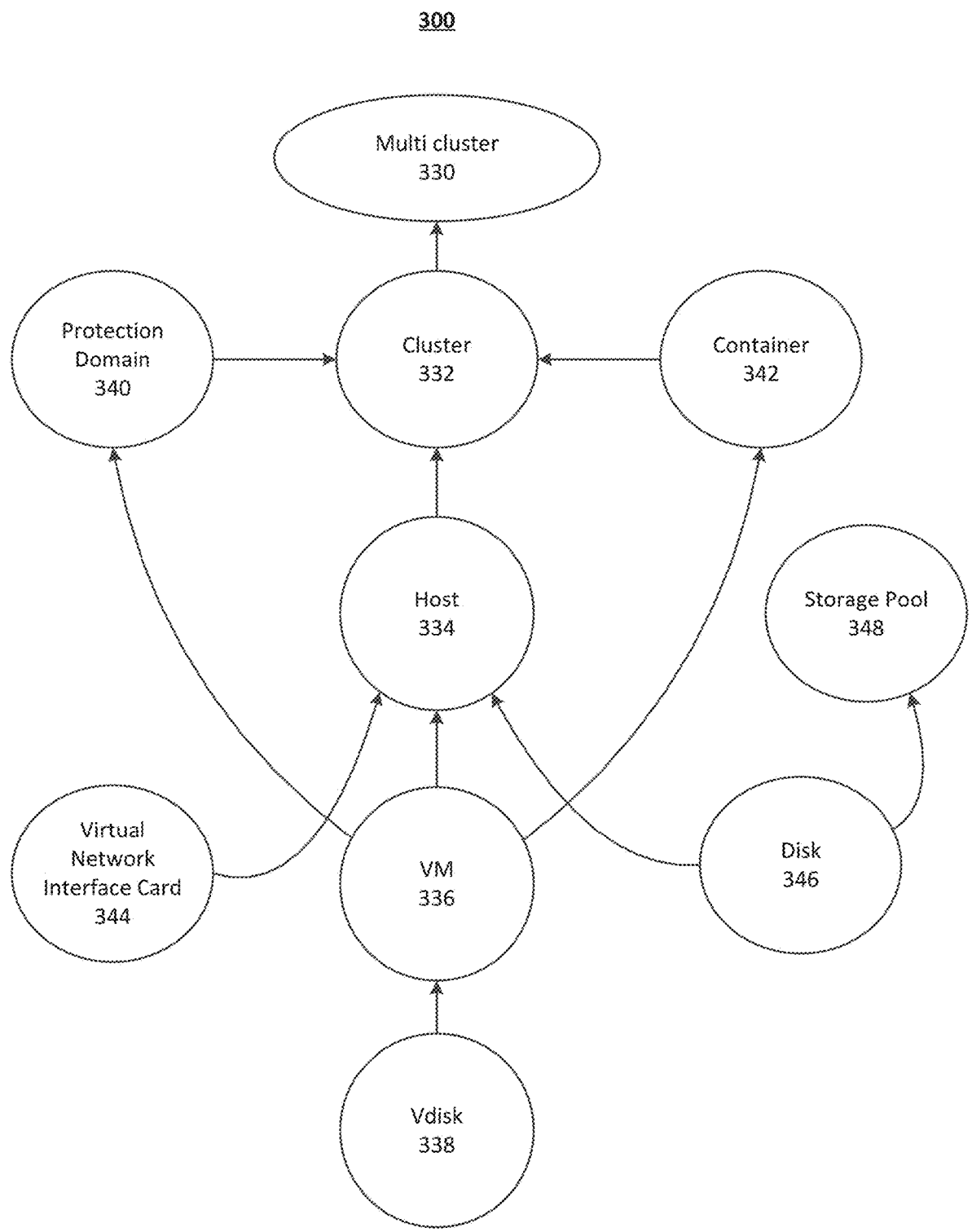
FIG. 3A illustrates an example entity-relationship graph for entities associated with a virtualization system according to some embodiments.

FIG. 3A illustrates an example entity-relationship graph 300 for entities associated with virtualization system 100. As shown in FIG. 3A, entity-type nodes may include a multi-cluster-type node 330, a cluster-type node 332, a host-type node 334, a virtual-machine-type node 336, a virtual-disk-type node 338, a protection-domain-type node 340, a container-type node 342, a network-interface-card-type node 344, a disk-type node 346, and a storage-pool-type node 348. In particular embodiments, the direction of the edge connecting the nodes indicates a child-parent relationship (e.g., the arrow goes from a child node to a parent node). As an example and not by way of limitation, cluster-type node 332 is a child node of multi-cluster-type node 330 and the parent node of protection-domain-type node 340 and container-type node 342. As another example and not by way of limitation, virtual-machine-type node 336 is a child node of protection-domain-type node 340, host type node 334, and container-type node 342, and a parent node of virtual-disk-type node 338.

Figure 3B:
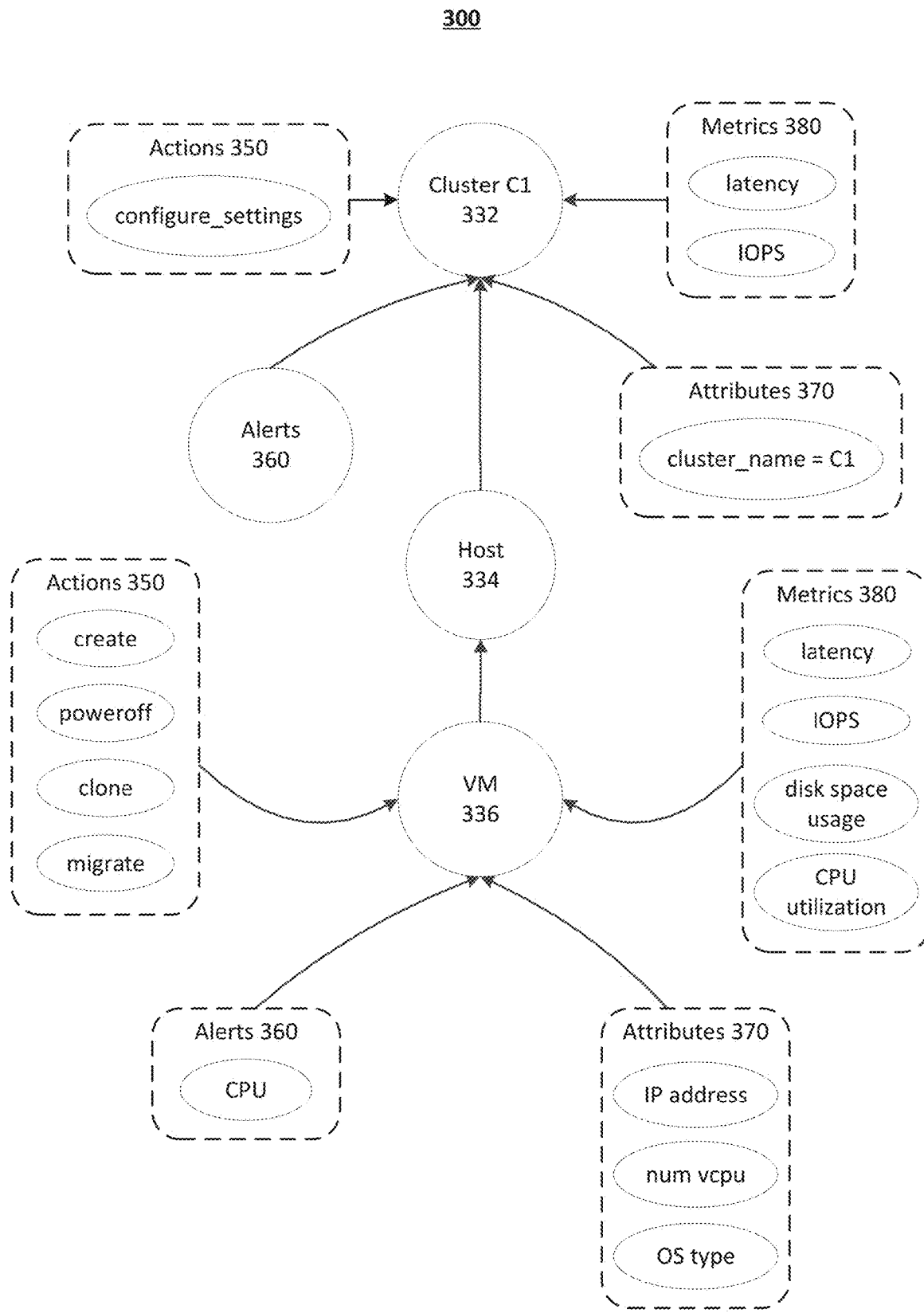
FIG. 3B illustrates another example entity-relationship graph for entities associated with a virtualization system according to some embodiments.

FIG. 3B illustrates another example entity-relationship graph 300 for entities associated with virtualization system 100, together with example attributes, actions, metrics, alerts, and other information associated with the entities. As an example and not by way of limitation, cluster-type node 332 may be associated with action-type nodes 350 (e.g., settings, etc.), alert-type nodes 360, attribute-type nodes 370 (e.g., cluster name "C1") and metric-type nodes 380 (e.g., I/O operations per second ("IOPS"), latency, etc.). As another example and not by way of limitation, virtual-machine-type node 336 may be associated with action-type nodes 350 (e.g., create, poweroff, clone, migrate, etc.), alert-type nodes 360 (e.g., alert types such as cpu, etc.), attribute-type nodes 370 (e.g., num vcpu, IP address, OS type, etc.), and metric-type nodes 380 (e.g., IOPS, latency, CPU utilization, diskspace usage, etc.).

Figure 4:
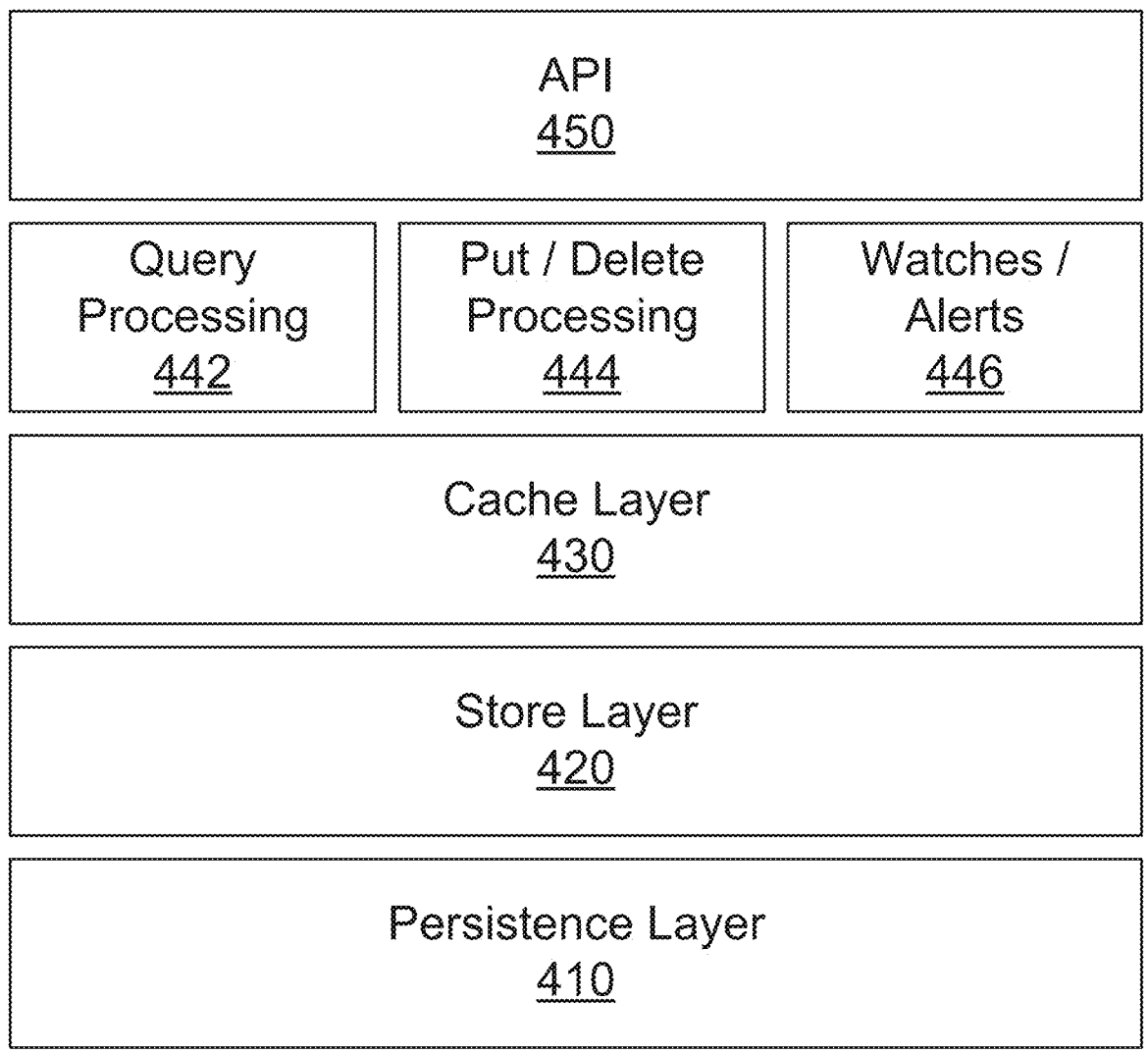
FIG. 4 illustrates an example architecture for an entity database according to some embodiments.

FIG. 4 illustrates an example architecture for the entity database. The architecture may comprise a Cache Layer 430 on top of a Store Layer 420 on top of a Persistence Layer 410 (e.g., underlying data store and/or volume groups in the storage pool). The architecture may support a query processing process 442, put/delete processing process 444, and watches/alerts process 446. The architecture may also expose functionality via an API 450. Persistence Layer 410 may comprise persistent non-volatile storage of the database information. Cache Layer 430 may comprise storage of information that is expected to be retrieved frequently or in a relatively short time span, or any suitable transitory storage before moving data to persistent storage.

In particular embodiments, the Store Layer 420 handles requests from and responses to API layer 450 to store and retrieve data from Persistence Layer 410. The Store Layer 420 may handle building and updating database schemas by example, registering entity types and metrics types. As an example and not by way of limitation, Store Layer 420 may register a VM-type entity having an IP Address, Number of Virtual CPUs and OS Type attributes. Store Layer 420 may also handle creation, update and deletion of entities and attributes. As an example and not by way of limitation, Store Layer 420 may create a VM-type and populate the attributes described above. Furthermore, Store Layer 420 may update metrics associated with entities.

In particular embodiments, entity updates and stats updates are treated differently by the database. As an example and not by way of limitation, entity updates may be atomic and write-through, so that a read operations will obtain the most recent values associated with entities. However, metrics and statistics (e.g., cache usage, CPU usage, disk usage, and data transfer rate) may be lazily updated in order to improve database performance. Thus, a read operation on metrics may not yield the most recent data. Each attribute change of an entity is also stored as a metric so that attribute and metric values can be populated together as time series in an entity trail. In particular embodiments, metrics may be aggregated on hourly basis.

In particular embodiments, the database may store current entity state information as well as an entity trail for some or all entities. In particular embodiments, an entity trail may include some or all historical values for the entity, along with corresponding timestamps for each value. As an example and not by way of limitation, a Host entity may have one child VM entity at a time 1000, and then receive an update to initiate a second VM entity at time 1002, and then a third VM entity at time 1006. The database may store the first VM entity with associated timestamps 1000-1006 and the second VM entity with associated timestamps 1002-1006 in the entity trail. In this manner, the database may be able to track every entity's transition over time. Although this example manner of storing timestamps is described for ease of explanation, other suitable manners of storing timestamps may be used, as will be explained further. The entity database may store statistics indexed by certain dimensions to support efficient querying of stats data; additionally, the statistics can be de-normalized for fast data access. For example, the database may store statistics indexed by entity ID over a longer time range, which allows entity database to efficiently return statistics for a particular entity for long periods of time. Entity database data may also be grouped by entity type and metric, which may enable the database to efficiently return statistics for all entities of a particular type (e.g., all VMs) for a shorter time range.

In particular embodiments, the database may provide mechanisms to query and retrieve a current state of an entity, as well as the state of the entity at a specific point in the past, or the states within a time range. In particular embodiments, the database may provide mechanisms to query and retrieve past metrics. In particular embodiments, the database also provide future metrics through extrapolation or any suitable method of predicting future metrics. As an example and not by way of limitation, assuming a present time of 1000, a user may query the database for the CPU utilization of a Host-type entity from times 900-1100. The database may return a set of values and associated timestamps where values for timestamps 900-1000 correspond to observed values and values from 1000-1100 correspond to an extrapolation based on the slope of the observed curve. Metrics may be stored as raw values, or may be stored in buckets by using downsampling.

In particular embodiments, the database may provide a query language interface (e.g., SQL) to retrieve current and historical entity, attributes, and metrics data. As an example and not by way of limitation, the query language interface may support the following types of queries:
  Point queries: retrieves an attribute value for a time range (e.g., fetch num_iops from VM1 for t1 to t2).
  Filter queries: retrieves entities or attributes based on filtering using expressions on entity attributes and statistics (e.g., fetch num_iops for VMs with cpu_usage>50).
  Grouping queries: retrieves entities or attributes grouped by entity attributes and statistics (e.g., fetch num_iops for all VMs grouped by cluster).
  Sorting queries: retrieves entities or attributes sorted by parameters
  Derived metrics: retrieves metrics based on expressions and rollup.

Figure 5:
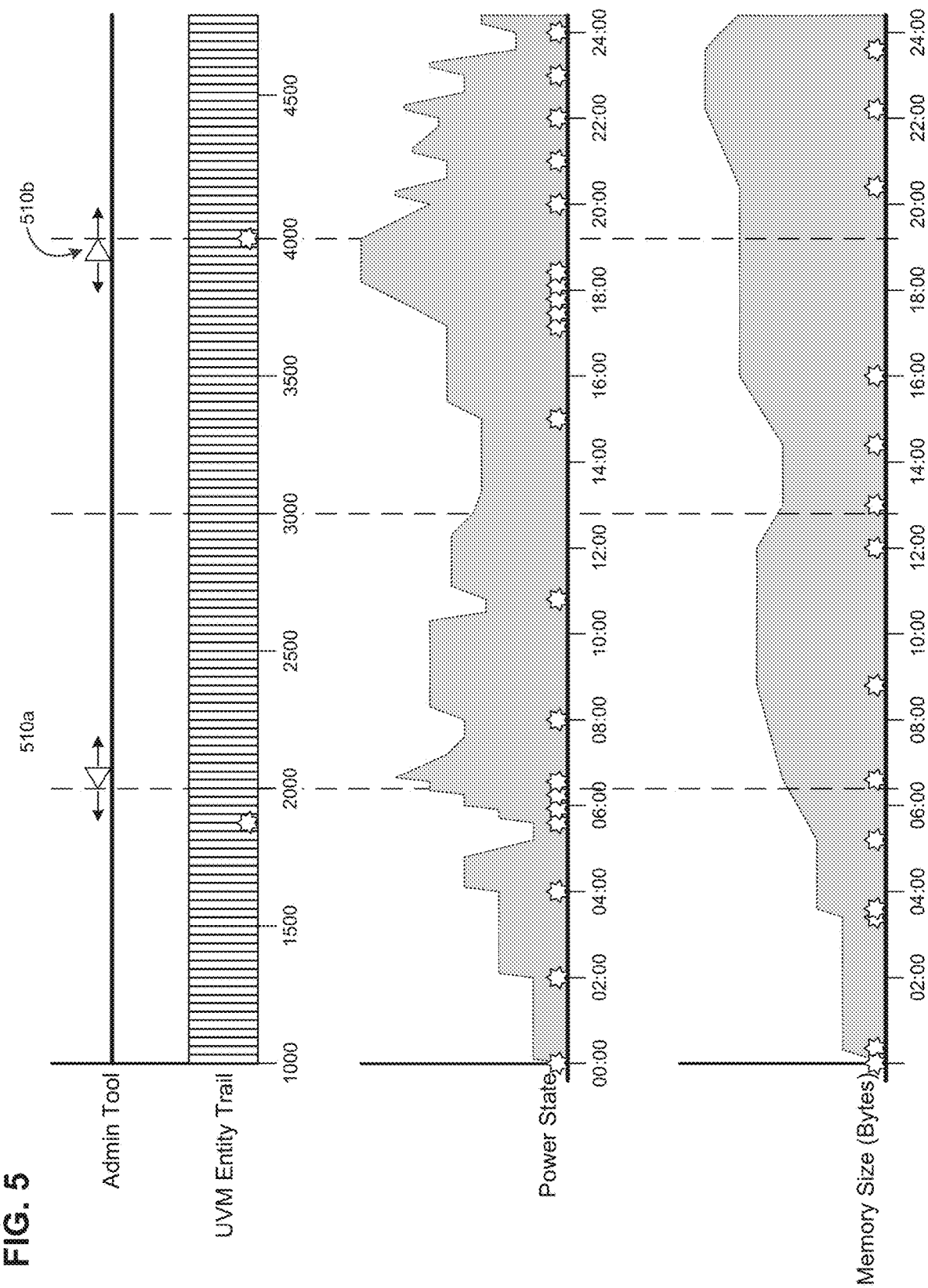
FIG. 5 illustrates an example entity trail for a user virtual machine entity associated with a virtualization environment according to some embodiments.

FIG. 5 illustrates an example entity trail for a UVM entity associated with the virtualization environment. As shown in FIG. 5, entity trail information captures changes (represented by stars) in configuration and/or state information for the UVM entity. For example, at time 1875, the UVM may have begun serving additional applications previously served by another UVM that failed, until the failed UVM was restarted at time 4000 and the applications were moved back to the restarted UVM. The corresponding changes to the UVM's Power_State and Memory_Size_Bytes entity attributes (other attributes may include, e.g., replication factor, provisioned CPU, Memory, SSD) may also be captured as part of the entity trail information for the UVM. In particular embodiments, tools for an administrator of the virtualization environment may enable the administrator to view the state of the virtualization environment at different points in time/time periods (e.g., actual past performance or predicted future performance). Such tools may also enable the administrator to easily roll back the state of the virtualization environment to a past point in time (e.g., in order to "reset" the state or perform testing). As an example and not by way of limitation, a user interface for such tools may simply incorporate a slider 510 (e.g., comprising an element 510A to select a start point of a time period and an element 510B to select an end point of the time period) to navigate forward and backward in the entity trail. As shown in FIG. 5, in particular embodiments, the user interface may provide the ability to select a time period and then display entity trail information in a graphical manner.

In particular embodiments, the database may use a data model where the basic unit is an "entity" identified by entity id. Entities may be atomically updated. Each entity may have a list of key/value pairs called attributes. For example an entity may have an id "VM #3," a "name" attribute with "Webserver" as its value, and an "ip_address" attribute with "10.4.75.23" as its value.

In particular embodiments, entities may be organized into disjoint sets called shards for the purpose of distributing processing between multiple nodes. In particular embodiments, an entity may belong to exactly one shard. Processing of a shard (e.g., for caching, concurrency control, etc.) may be handled by a single node.

Entity modifications may be recorded to the entity trail. When an entity is updated, the previous value of the entity may be recorded into the trail. Thus, the trail would have the full history of entity modifications. Creations, updates and deletions may be treated the same way. In particular embodiments, when an entity is deleted, a "tombstone" record maintained in the DB as historical data. Entity modifications may be stamped with monotonically increasing wall-clock-based timestamps. The timestamps may be guaranteed to be unique within a shard. The guarantee may be implemented by maintaining one integer counter per shard that is atomically updated to the new timestamp with a higher value with every modification. In particular embodiments, the state of the virtualization environment at a time in the past may be resurrected from the captured entity trail.

In particular embodiments, the unique monotonically increasing timestamps may be used to track replicated changes. Data may be replicated across multiple database instances for various purposes such as, by way of example and not limitation, to provide global views, disaster recovery, run secondary analytics applications, etc. In particular embodiments, the database may track replicated modifications keeping the "last replicated" timestamp. Modifications may be replicated in the order of their timestamps, and after each modification is replicated, the "last replicated" timestamp may be advanced to account for replicated modifications.

In particular embodiments, the database may track timestamp ranges of replicated modifications, such that when all modifications that have timestamps between the bottom of the range and the top of the range are replicated, then the range is marked as replicated. Replicated ranges may be tracked in a map that contains non-overlapping ranges. If adjacent or overlapping ranges are replicated, the ranges in the map may be merged together, and thus the representation of replication state may be reduced. Assuming a scenario where all modifications are replicated (for example, due to updates at every time), the representation would only take one extra integer compared with an approach of keeping track of the "last replicated" timestamp.

Range-based replication state tracking may provide several benefits to the database. For example, independent failure modes: if one modification fails to replicate, other modifications still can be replicated; with "last replicated" timestamp any failure may stall further replication. Furthermore, range-based replication may allow modifications to be sent via multiple channels in any order, without having to serialize communication, while with "last replicated" timestamp ordering may need to be enforced. Moreover, range-based replication may provide the ability to replicate latest modifications before historical data. This may be beneficial for bootstrapping new replicas, since the current value of an entity may be more important for user scenarios than the entity trail. In particular embodiments, the database may not provide atomicity across entities, and each entity update may be applied independently from other entities.

Figure 6:
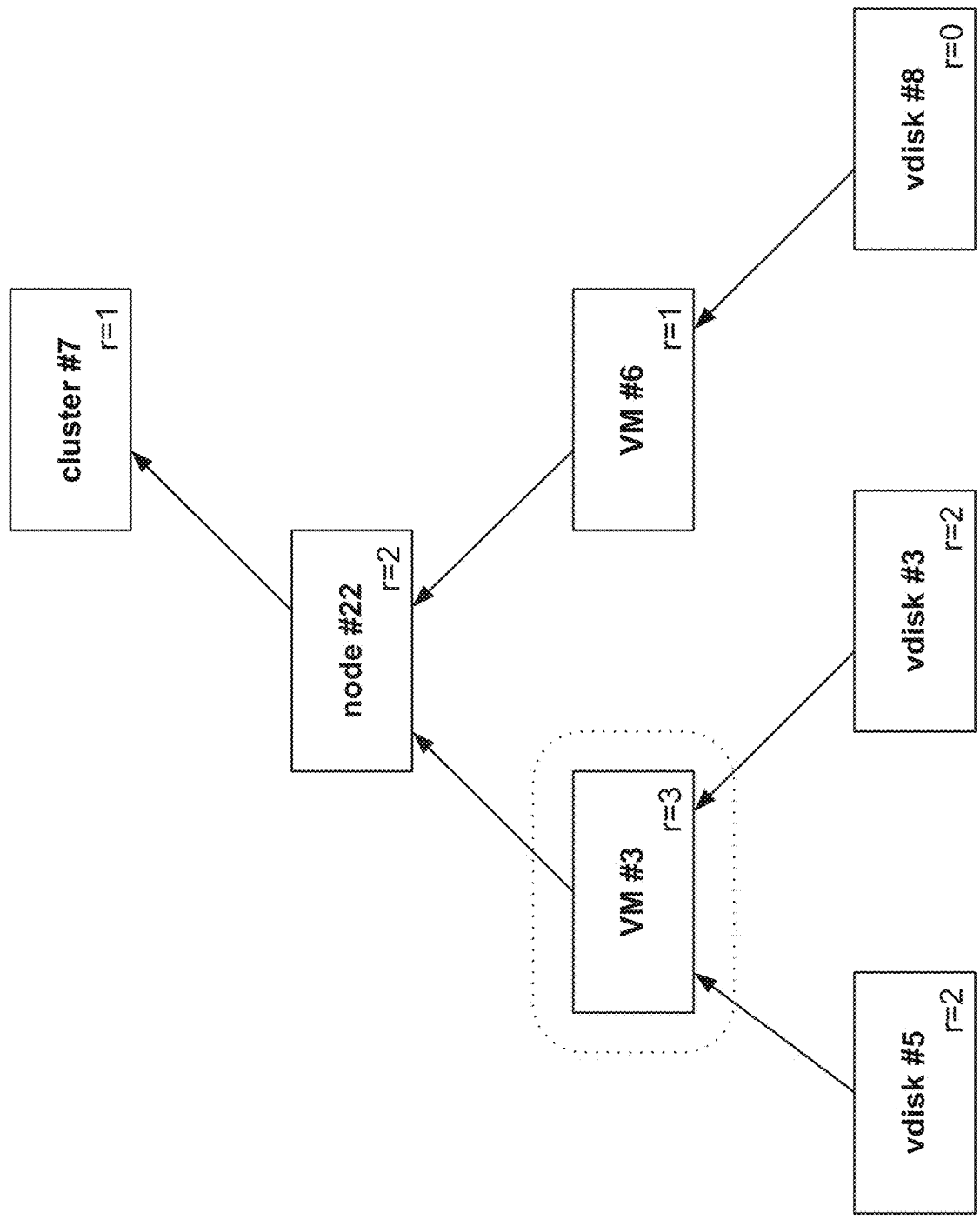
FIG. 6 illustrates an example context anchor entity ranking according to some embodiments.

FIG. 6 illustrates the context anchor entity ranking. As an example and not by way of limitation, the numbers in the bottom right corner of each box show the rankings that the searched entities would get if VM #3 is specified as a context anchor entity.

In particular embodiments, all ranks may be combined into the relevance rank that is used to sort the search results, so that the most relevant results may be at the beginning of the result list. In particular embodiments, the relevance score calculation algorithm for each entity may be as follows:
  for each attribute, an individual attribute rank may be a sum of the match closeness and the relevant attribute rank
  an entity attribute rank is calculated as the maximum of individual attribute ranks
  the relevance score may be calculated as the sum of entity attribute rank, related entity rank and context anchor entity rank.

Although the present disclosure describes calculating the relevance score for entities in a particular manner, the present disclosure contemplates calculating the relevance score in any suitable manner.

Entities in the database may be linked in a hierarchical manner using "parent" links. An entity may have any number of parents. For example, an entity with identifier "VM #3" could have a parent entity with identifier "Node #22," in which case the "VM #3" entity would have a parent link pointing to "Node #22" entity.

Entities of interest may be retrieved using the above described query functionality. In particular embodiments, a caller may pass a search substring and attributes to match. As an example and not by way of limitation, if the caller issued a search request with attribute_to_look_for="name" and substring_to_match="server", then the caller may get "VM #3" that has "name" attribute with the "Webserver" value.

Entities of interest may be retrieved using the above described query functionality. In particular embodiments, a caller may pass a search substring and attributes to match. As an example and not by way of limitation, if the caller issued a search request with attribute_to_look_for="name" and substring_to_match="server", then the caller may get "VM #3" that has "name" attribute with the "Webserver" value.

A Search may return results in order of relevance (e.g., most relevant first). In particular embodiments, the relevance order may be determined by a relevance score or rank assigned to entities as a result of a ranking algorithm. In particular embodiments, the relevance score may be calculated based on several rankings of the following relevance signals:
  match closeness
  relevant attributes
  related entities
  contextual entities In particular embodiments, match closeness reflects how similar the resulting value is to the provided search substring. As an example and not by way of limitation, there may be three levels of match closeness: full match (the value is equal to the provided substring), prefix match (the provided substring is the prefix of the value), and any other match. As an example and not by way of limitation, in the case of full match the rank is 3, in the case of prefix match the rank is 2, and in the case of other match the rank is 1.

The caller of the search request may specify relevant attributes as one of the ways to specify context for search. For example, the caller might want entities that have a match in "ip_address" attribute to be ranked higher in the search results than entities with matches in other attributes. In particular embodiments, the rank that is assigned when a relevant attribute matches may be specified by the caller. As an example and not by way of limitation, the caller may specify relevant_attribute="ip_address", 31 to signify that a match in "ip_address" attribute would result in assigning a rank of 3.

In particular embodiments, the caller of search may specify related entities as one of the ways to specify context for search. As an example and not by way of limitation, the caller might want descendants of "node #22" (e.g., VMs, virtual disks, virtual NICs, etc.) to be ranked higher than other entities. In particular embodiments, the caller specifies the rank that is assigned when an entity is a descendant of a relevant ancestor. As an example and not by way of limitation, the caller may specify relevant_ancestor={"node #22", 3} to signify descendants of node #22 have a rank of 3).

In particular embodiments, the caller of search may provide contextual or "context anchor" entities that are relevant to the search context. The context anchor entities may affect ranking of the search results. In particular embodiments, context anchor entities are identified from the context under which the search query was generated. As an example and not by way of limitation, a search context may be that a user is looking at a screen that shows VM #3 details and starts typing a search query. The interface may then pass VM #3 as a context anchor entity argument in the search request. In particular embodiments, the interface may provide auto-complete suggestions (where auto-complete uses search) that include entities that are related to VM #3.

In particular embodiments, a rank calculation may be performed for entities related to "anchor" entities. In particular embodiments, the rank of an entity is the path length between the ranked entity and the contextual entity in the entity relationship graph. In particular embodiments, the depth of traversal may be limited to a predetermined length (e.g., 3).

In particular embodiments, the relevance rank calculation algorithm may combine the above ranks. In particular embodiments, all entities initially have a rank of 0 and a context anchor entity itself may be assigned a predetermined rank (e.g., 3). In particular embodiments, the parents and children of the context anchor entity are assigned a lesser predetermined rank (e.g., 2) and the parents and children of those an even lesser predetermined rank (e.g., 1).

In particular embodiments, after an entity's information is updated with new information, the prior values for the entity are recorded in the entity database, along with associated timestamp that record the time when the entity had the prior values. In particular embodiments, the entity database may take a snapshot of all entities periodically (e.g., every 30 seconds, every 5 minutes, twice a day, etc.). By taking periodic snapshots, particular embodiments may avoid the burden of reading logs from the beginning of time in order to get the entire list of available entities and their states at a particular timestamp in the past. The entity database may also store the entity's statistics, such as, resource usage (e.g., CPU utilization, memory availability, storage availability, etc.). In particular embodiments, entity statistics may be downsampled by aggregating the information (e.g., taking the average, sum, minimum, maximum) over a time period. In this manner, instead of storing the prior values, the entity database may record less information where the information is representative of the prior values. In particular embodiments, such downsampling may continually occur as the entity statistics are collected (e.g., in order to reduce the volume of such logged information). In addition, older raw and/or downsampled statistics may be discarded as they expire (e.g., fall out of a rolling window of time, such as six months after the present time). In particular embodiments, certain common aggregation operations may be precomputed prior to receiving a relevant query in order to reduce latency.

In particular embodiments, the entity database may model real world objects as entities. Each entity may be identified by an entity unique identifier, such as a globally unique identifier (GUID). As an example and not by way of limitation, each entity may have an (entity type, id) pair and contain one or more attributes and metrics, each with a name and values represented as (time, value) pairs. As an example and not by way of limitation, an entity for a VM object may have an id "vm1", an attribute "vm_name" with a value (t1, "controller_vm1"), and metric "cpu_usage_percentage" with a value (t2, "60"). The attributes may also be used to express relationship between entities. In the above example, the VM entity may have a "node" attribute with a value "node1", which means that node1 is the parent entity of vm1. In particular embodiments, attribute updates may be fail-safe whereas metric updates may be lossy.

In particular embodiments, the entity database may provide a mechanism for transforming different database schemas into a single, unified schema. As an example and not by way of limitation, one or more database schemas describing portions of the virtualization environment may be combined into a unified schema that contains all information of the environment. In particular embodiments, rules describing on how to transform database schemas into a unified schema may specified in a template or configuration file and may include the following:

1. entity id conversion,
2. attribute and metric addition/deletion/renaming,
3. conversion of attributes to metrics,
4. suppression of entity/attribute updates while still supporting addition of metric information, and
5. defining version-specific schema conversion.

Entity ID conversion. In particular embodiments, the entity database server may receive entity data associated with a portion of the virtualization environment. As an example and not by way of limitation, the entity database server may receive data from multiple registered clusters of computers that user a different database schemas. The entities received by the entity database may have cluster-wide (but not globally) unique IDs. In particular embodiments, before we add those entities to the entity database, the entity IDs are converted into globally unique identifiers. In particular embodiments, the entity database makes use of an attribute value that is globally unique. In the above VM example, the entity database may derive the entity ID from a "vm_uuid" attribute. The resultant VM entity may then have a "transformed" globally unique entity ID.

Attribute/Metric addition, deletion and renaming: In particular embodiments, there may attributes or metrics that do not have significance in the unified data model, and the entity database may ignore them. As an example and not by way of limitation, an older schema may have a "node" entity with a "vm_ids" attribute that specifies a list of VMs attached to the node. However, the entity database may include attributes that define a parent-child relationship, as explained above, and therefore a list of attached VMs may be redundant. As a result, the entity database may ignore the list. Similarly, attributes may be renamed to create the parent-child relationship in the entity database. As an example and not by way of limitation, the older schema database may contain a VM entity, vm1, that has a "node_uuid" attribute with value "node1." In the entity database, the corresponding attribute would be "node", so the entity database may rename this attribute name to "node" before adding it to the database. The attribute value may remain unchanged. Therefore, after the rename operation, the entity database may have a "vm" entity that has an implicit reference to a "node" entity with id "node1".

Conversion of attributes to metrics: Since the entity database may provide fail-safe guarantees for attributes, such updates may be more expensive than metric updates. In particular embodiments, the entity database may convert attributes to metrics. As an example and not by way of limitation, if the entity database receives updates for certain attributes very frequently, those attributes may be converted to metrics in order to reduce the number of fail-safe updates needed. In particular embodiments, metrics updates in the entity database are not write-through.

Suppression of entity updates: In particular embodiments, the schema transformation may be used to suppress entity updates while still allowing metrics data into the entity database. As an example and not by way of limitation, an entity attribute may be transformed into a metrics type attribute when the entity database does not want fail-safe updates for the attribute.

Version-specific schema conversion: In particular embodiments, the schema conversion for the entity database may be driven by a version-specific configuration. As an example and not by way of limitation, the entity database may be configured to suppress entity updates when the data is received from a cluster running a specific version of software (e.g., Nutanix OS). In particular embodiments, the cluster version may be specified in the configuration file as a regular expression string.

In particular embodiments, a "user interface" (UI) framework may be used for "dynamically" presenting entities in a virtualization environment, to permit relevant information about particular entities to be presented to a particular user or client. In particular embodiments, the framework may enable presentation of any arbitrary entity or resource or group or combination thereof (homogeneous or heterogeneous). In particular embodiments, the framework may retrieve or construct an entity schema and an object that describes the entity or entities. Based on the schema, the framework may be able to generate visualizations to present the data. In particular embodiments, the framework may be also dynamically able to filter, group, sort, rank/order, and color-code the entities and/or resources, as well as providing the functionality to take actions on a selected group of items. In particular embodiments, the framework may also provide different types of graphical representations of entities and/or resources in the virtualization environment. In particular embodiments, the framework may provide an API and/or libraries enabling creation of customized versions of the GUI features. In particular embodiments, the following components may make up the framework:

Dynamic Entity Presentation: In particular embodiments, arbitrary entity types may be presented into the framework with no hard-coded data for how to present the entity information. Each entity type may be described by its schema, and all the other pieces of the framework may adhere to this schema in determining the presentation method.

Visualizations: In particular embodiments, a framework may be a plugin framework for displaying visualizations of the entity-relationship graph in a user interface so that the full user interface may be created based on the definition of a few content files. In particular embodiments, the framework may allow a finite number of types of visualizations or user interfaces, with the option to add more. As an example and not by way of limitation, the framework may initially allow three types of visualizations, but more visualizations may be plugged in. In particular embodiments, each visualization may have a consistent interface and the framework keeps all visualizations synchronized.

Perspectives: In particular embodiments, the framework may provide for grouping of related attributes of an entity type into perspectives. In particular embodiments, the framework may permit an additional dimension of presenting related information. As an example and not by way of limitation, instead of a flat presentation of all attributes on a single user interface, users may specify groups of attributes of interest to be placed into different perspectives (e.g. layers) and switch between them.

Filtering: In particular embodiments, the framework may automatically generate and present one-click filtering for the entity type. In particular embodiments, the one-click filtering may provide a very fast and smooth presentation of data to the users with minimal user input. In particular embodiments, for continuous data, filter ranges may be dynamically created based on the data available and presented to the user.

Coloring: In particular embodiments, entities and/or resources may be colored by attributes to distinguish the entities and/or resources for presentation. In particular embodiments, the use of color may provide a visual data exploratory interface. As an example and not by way of limitation, an interactive legend may be provided to identify each color group to the user and what a particular color signifies.

Grouping: In particular embodiments, entities may be placed into groups. In particular embodiments, determination of a grouping for an entity may be based on user input. In particular embodiments, multiple users may provide input for a particular entity. The UI framework may determine whether the multiple inputs can be reconciled. If not, the UI framework may select a "winning" user input based on information known about each user. As an example and not by way of limitation, two users may provide inputs to define a particular entity, where one user is designated a "premium" user. The UI framework may prioritize the premium user's input over another user. In particular embodiments, the determine of a group for an entity may be automatically determined by the UI framework. As an example and not by way of limitation, entities may be placed into groups based on common activity-type nodes associated with those entities. In particular embodiments, one entity may be associated with a plurality of groups. In particular embodiments, the visual presentation of a group of entities may further include information regarding the children of the entities in the group.

Point in time analysis: In particular embodiments, each set of data presented in the UI framework for searches and presentation of entities and/or resources may correlate to a point in time or time period. In particular embodiments, the entity browser may show the latest entity information by default. In particular embodiments, using UI configuration features, the browser may present data at any arbitrary time range. In particular embodiments, the UI framework may provide the user with elements to navigate back and forth through different points in time through the presentation of entity information.

Selection Set: In particular embodiments, when browsing or searching for entities and/or resources, the user may select one or more entities or resources and use them for later analysis. In particular embodiments, the UI frame work may treat the selected set as a dynamic set of entities that may adhere to all filters, group-by, coloring, and visualization features of the entity browser.

Labels: In particular embodiments, when browsing or searching for entities and/or resources, the UI framework may enable the user to select one or more entities or resources, and further create and apply labels to the selected entities or resources. As an example and not by way of limitation, the user may submit a complex query bringing up search results of the query, and then apply a bulk label to some or all of the entities and/or resources in the search results. in this example, the UI framework may subsequently enable provide the ability to display, filter, group, sort, rank/order, color-code, and/or take actions on the entities and/or resources by label. In particular embodiments, more than one label may be applied to any given entity or resource.

Actions: In particular embodiments, when browsing or searching for entities, the user can select entities and apply actions to the selected entities and/or resources. In particular embodiments, a "shopping-cart" style feature may enable the user to perform multiple rounds of selecting entities and/or resources (e.g., after searching, browsing, grouping, filtering, sorting, etc.), and then perform a single action upon all entities and/or resources in the "shopping-cart." In particular embodiments, the UI framework may then execute all designated actions from the shopping-cart on the designated entities and/or resources.

Figure 7:
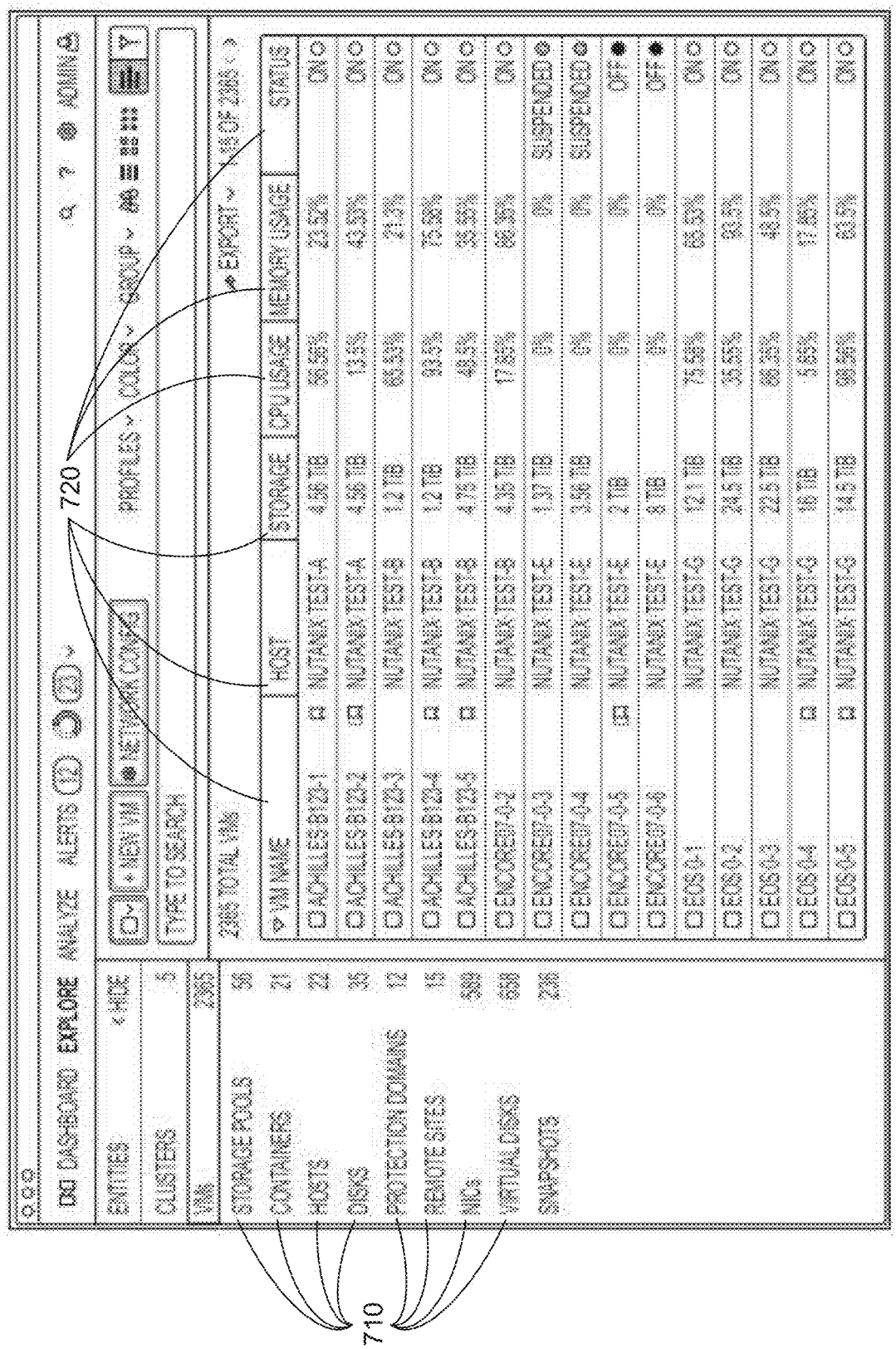
FIG. 7 shows an example client user interface illustrating a list of virtual machines in a virtualization environment with associated attribute values according to some embodiments.

FIG. 7 illustrates an example embodiment of the UI framework with a display of all VM-type entities currently existing in the virtualization environment. The list of entities may be sorted by any of several attributes 720, including, for example, name, host machine/hardware node, storage (total capacity or available), CPU usage, memory usage, status, or available actions. The list of displayed items (e.g., attributes, properties, statistical data, etc.) may differ between different entity types. In the example of FIG. 7, a user may also select other entity-types 710 to view the entities of those types in the virtualization environment. In this example, the user may select storage pools, containers, hosts, disks, protection domains, remote sites, NICs, virtual disks, or snapshots.

Figure 8:
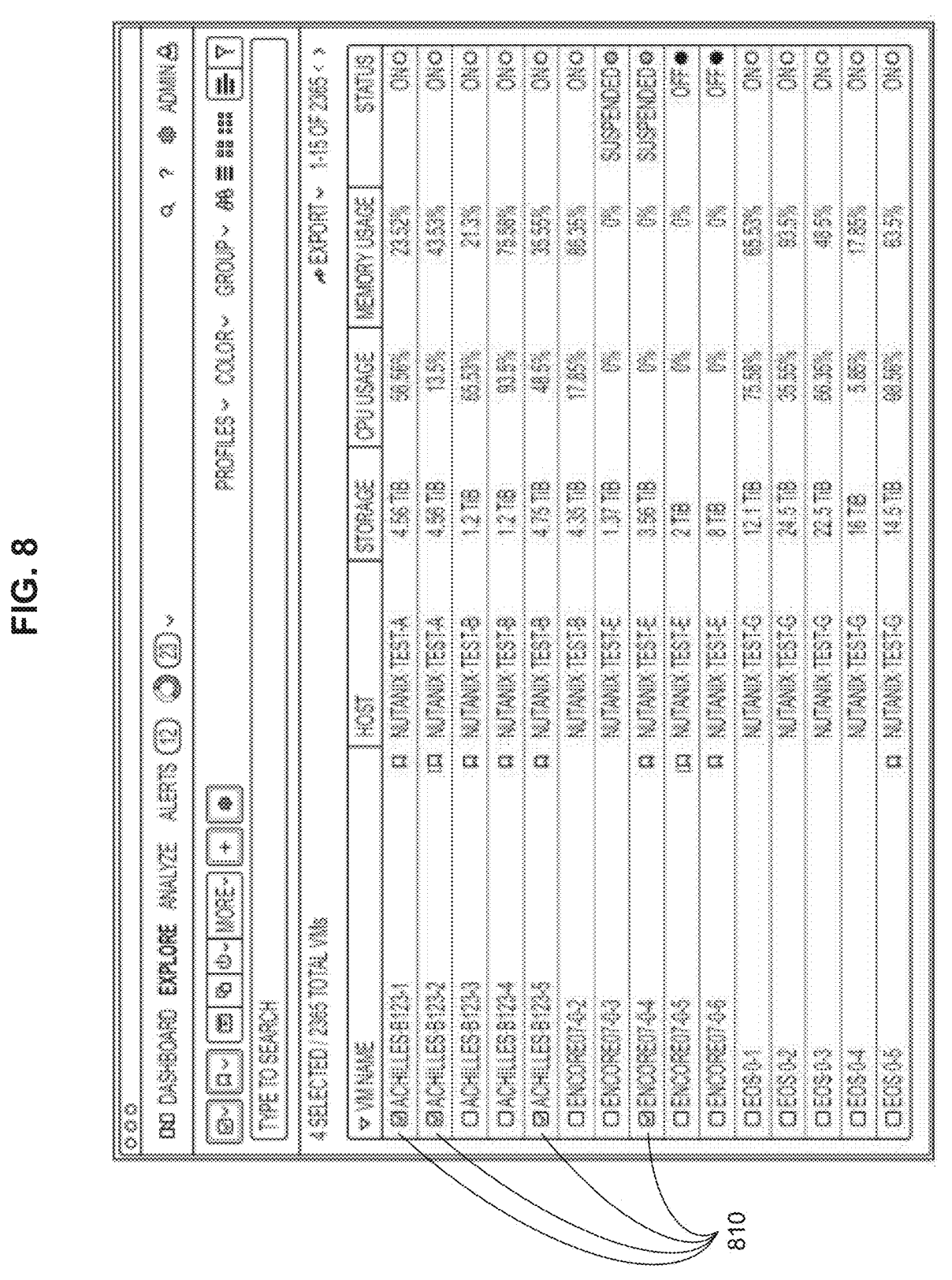

FIG. 8 illustrates a query results UI framework enabling selection of certain VM-type entities currently existing in the virtualization environment. In the example of FIG. 8, a user may click on checkboxes 810 next to each entity displayed in order to select the corresponding entity. In particular embodiments, the user may then perform actions or apply labels to the checked entities only.

Figure 9:
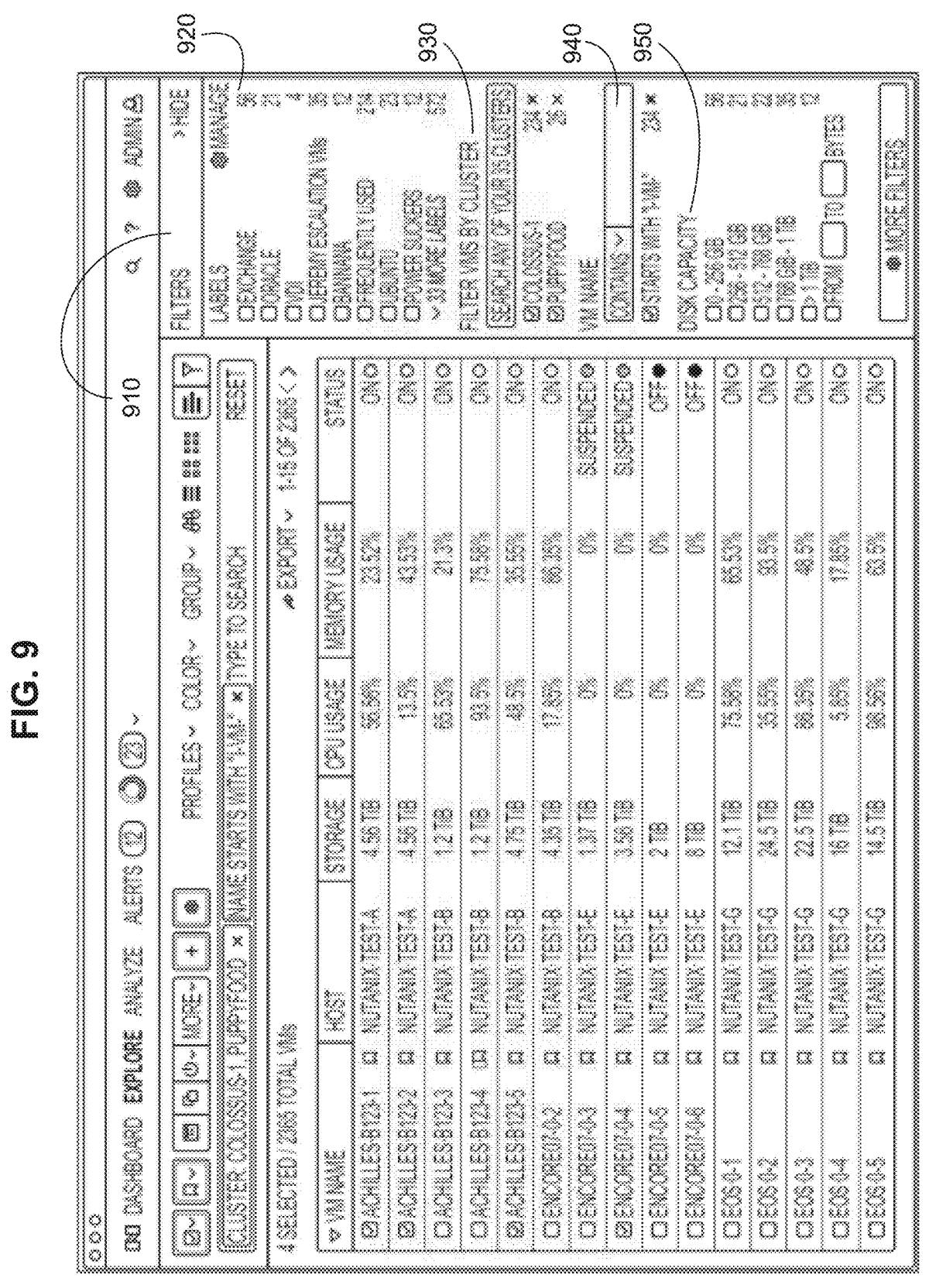

FIG. 9 illustrates a UI enabling application of various filters to the selected VM-type entities. The UI may include a window 910 to display various filtering options. Filtering options may include filtering by label 920, so that a user may select one or more labeled that have already been applied to the entities, and the UI may present only those entities with the selected labels. Another example of a filter may be by cluster 930. The entities presented in the UI may already be assigned to one or more clusters, and the user may select which clusters he or she would like to view. Another filtering option may be a text search field 940 which may enable a user to search for a particular VM by name, if it is known. Another filter 950 may specify a particular attribute of the entity. In the example of FIG. 9, filter 950 may differentiate entities based on their disk capacity, so that a user may filter and view only those entities with a certain amount of disk space. In particular embodiments, any other attribute of the entities may be selected, such as available disk capacity, CPU type or speed, or network bandwidth. In particular embodiments, a user may view additional filtering options through a user element 960.

Figure 10:
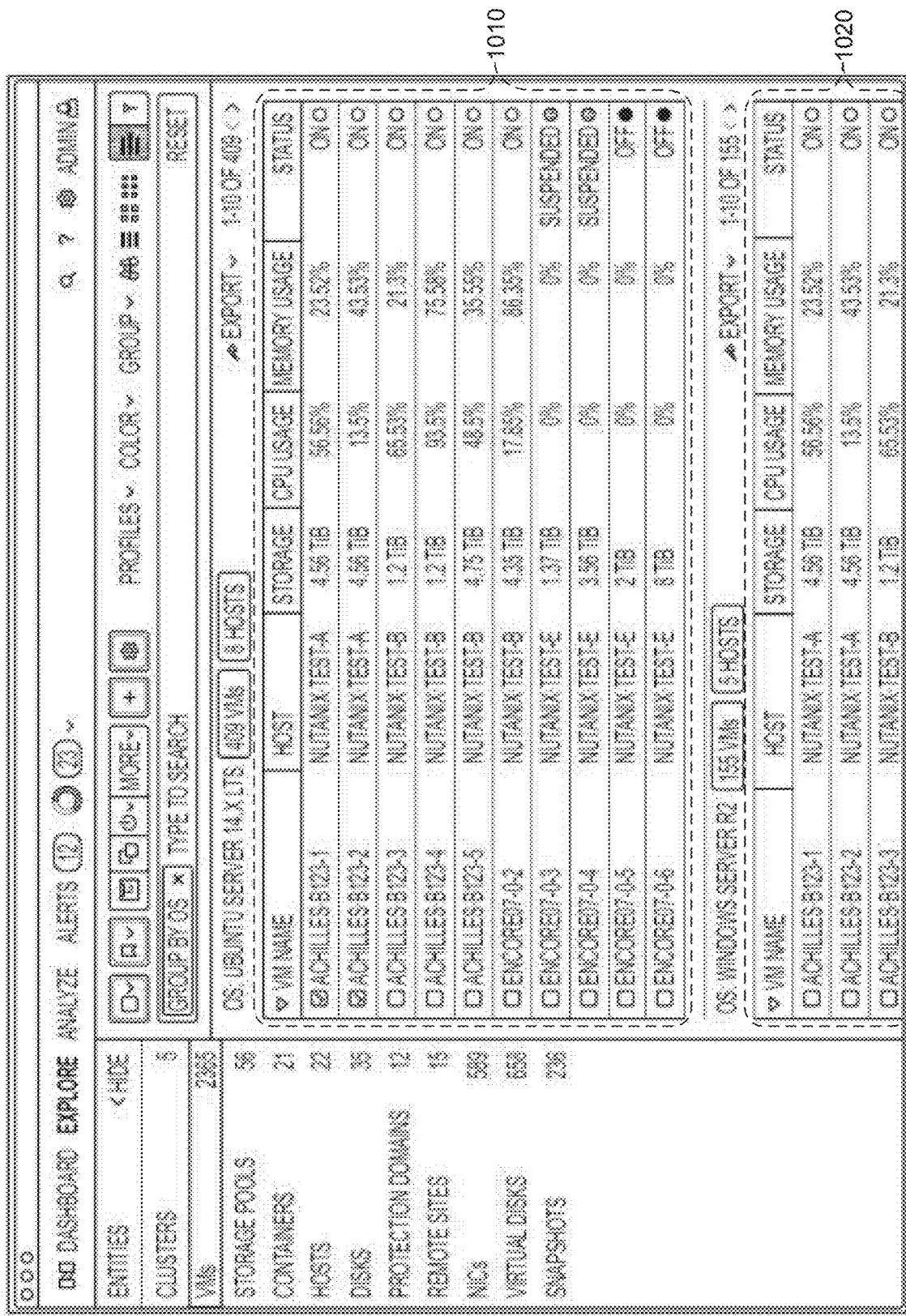
FIG. 10 shows an example client user interface illustrating grouping entities and attributes in a search feature according to some embodiments.

FIG. 10 illustrates a UI enabling grouping of the selected VM-type entities by different attributes or properties (e.g., grouping VMs by OS). In particular embodiments, the grouping of VM-type entities may be based on the application of one or more filters, as discussed in FIG. 9. In the example of FIG. 10, there are two groups 1010 and 1020 presented. Group 1010 includes VM-type entities with the operating system Ubuntu Server 14.X LTS, and includes 409 VM-type entities and eight hosts. Group 1020 includes VM-type entities with the operating system Microsoft Windows Server R2, and includes 155 VM-type entities and five hosts. In particular embodiments, a user may further filter within a group, export the information for the particular group, or perform any other action as he or she would for the overall set of entities in the virtualization environment.

Figure 11:
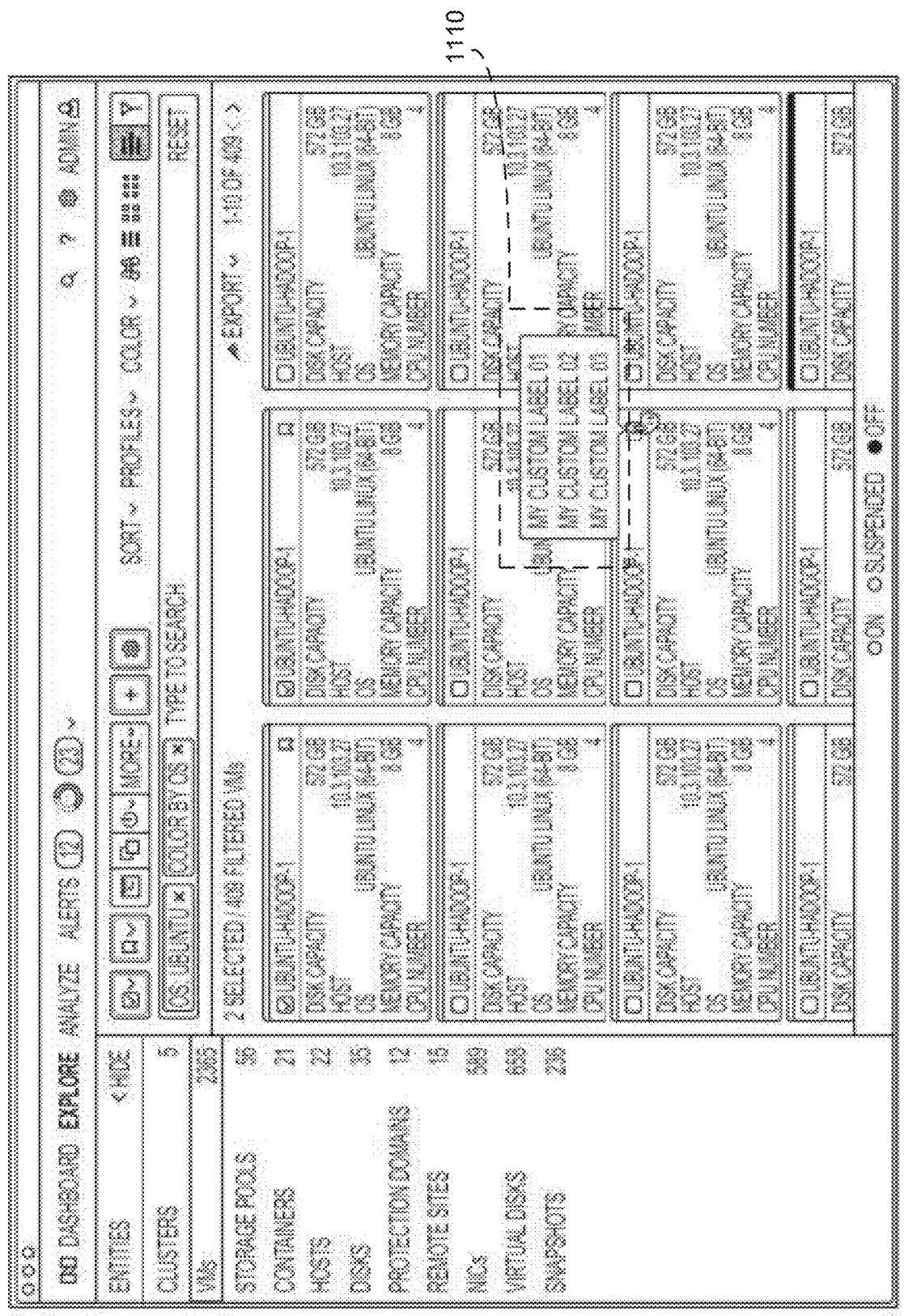
FIG. 11 illustrates a UI displaying labels applied to the selected VM-type entities.

FIG. 11 illustrates a UI displaying labels applied to the selected VM-type entities. In particular embodiments, a corresponding UI may enable creation of labels that may then be applied to one or more selected entities. In the example of FIG. 11, the UI may present information about each entity in a separate window. A user may select a particular entity and select one or more labels to apply to the selected entity through element 1110 which may appear in response to the user selection of the entity. Once the user has selected one or more labels, the UI framework may apply those labels to the selected entity.

Figure 12:
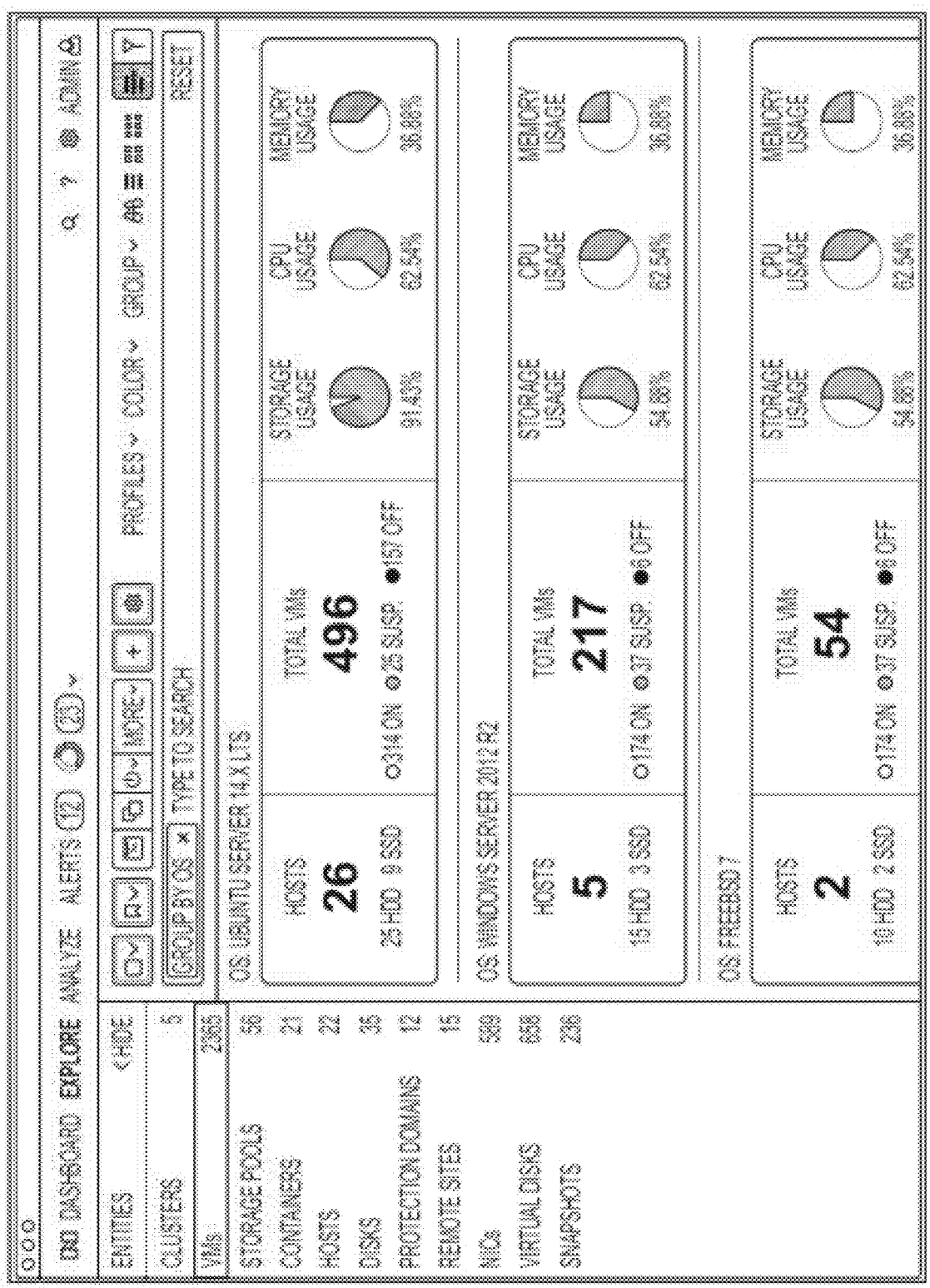
FIG. 12 shows an example client user interface illustrating a statistics display based on grouping and derived metrics according to some embodiments.

FIG. 12 illustrates a UI displaying group-based statistics and other information for the selected and grouped VM-type entities. In the example of FIG. 12, the selected groups are similar to the groups of entities created in the example of FIG. 10. In the FIG. 12 interface, the UI displays attributes and metrics-based information about the combined set of entities in each group. For example, for the first group of Ubuntu VM-type entities, the UI displays the total number of hosts and VMs, the status of the VMs (e.g. active, suspended, or off), the amount of storage space being used, the current CPU usage for the group of entities, and memory usage.

Figure 13:
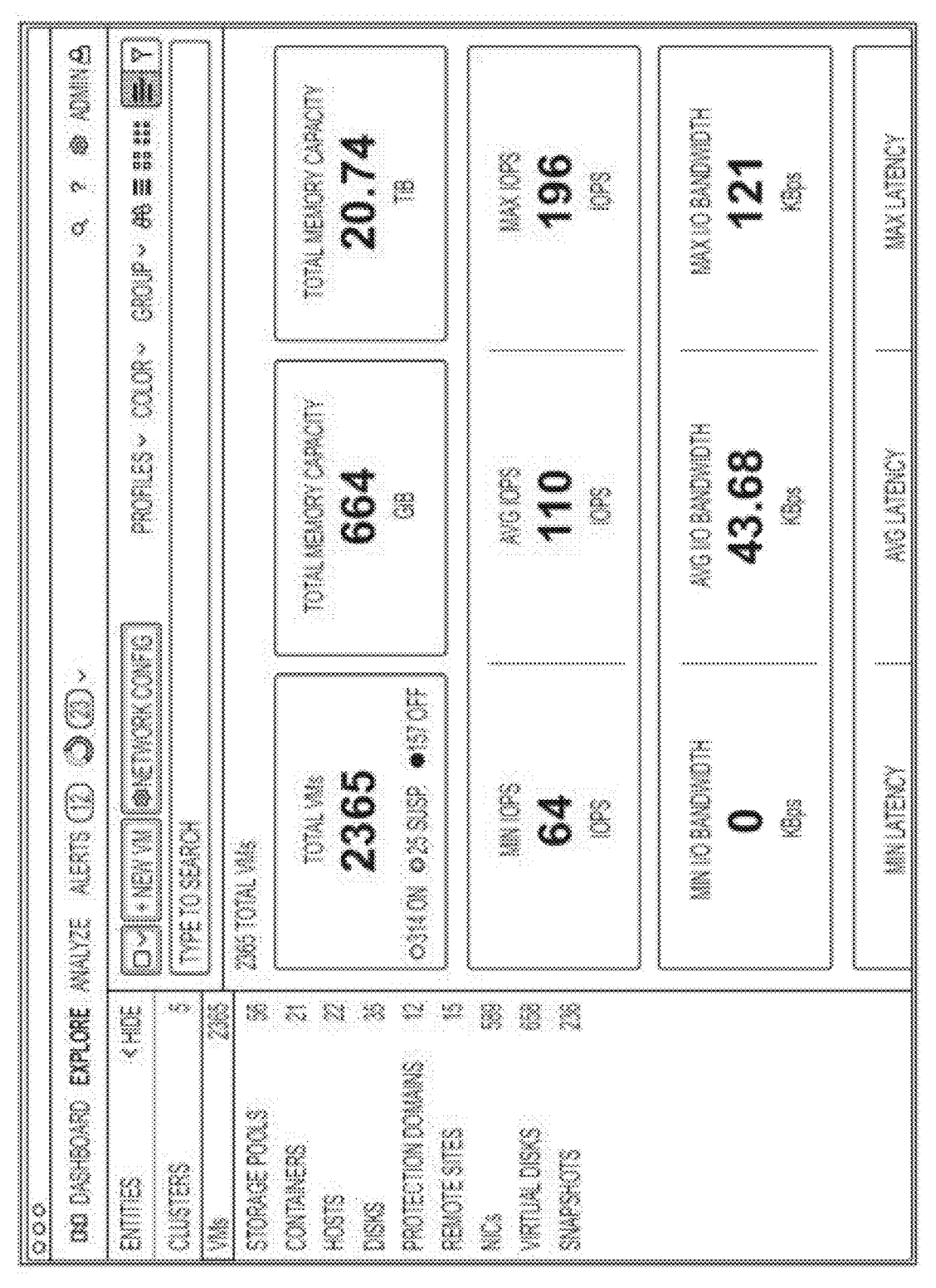

FIG. 13 illustrates a UI displaying overall statistics and other information for all VM-type entities currently existing in the virtualization environment. In the example of FIG. 13, the total number of VM-type entities, total disk capacity, total memory capacity, minimum, average, and maximum values for IOPs, bandwidth, and latency, etc. In particular embodiments, a user may select one of the presented elements and view more information about the characteristic, or about the entity representing that value. As an example and not by way of limitation, if a user selects the element displaying the maximum bandwidth, the UI may switch the display to present information about the particular VM-type entity corresponding to that bandwidth. As another example, if a user selects the element displaying the total disk capacity, the UI may switch the display to present an individual breakdown of disk capacity by entity or by group.

Figure 14:
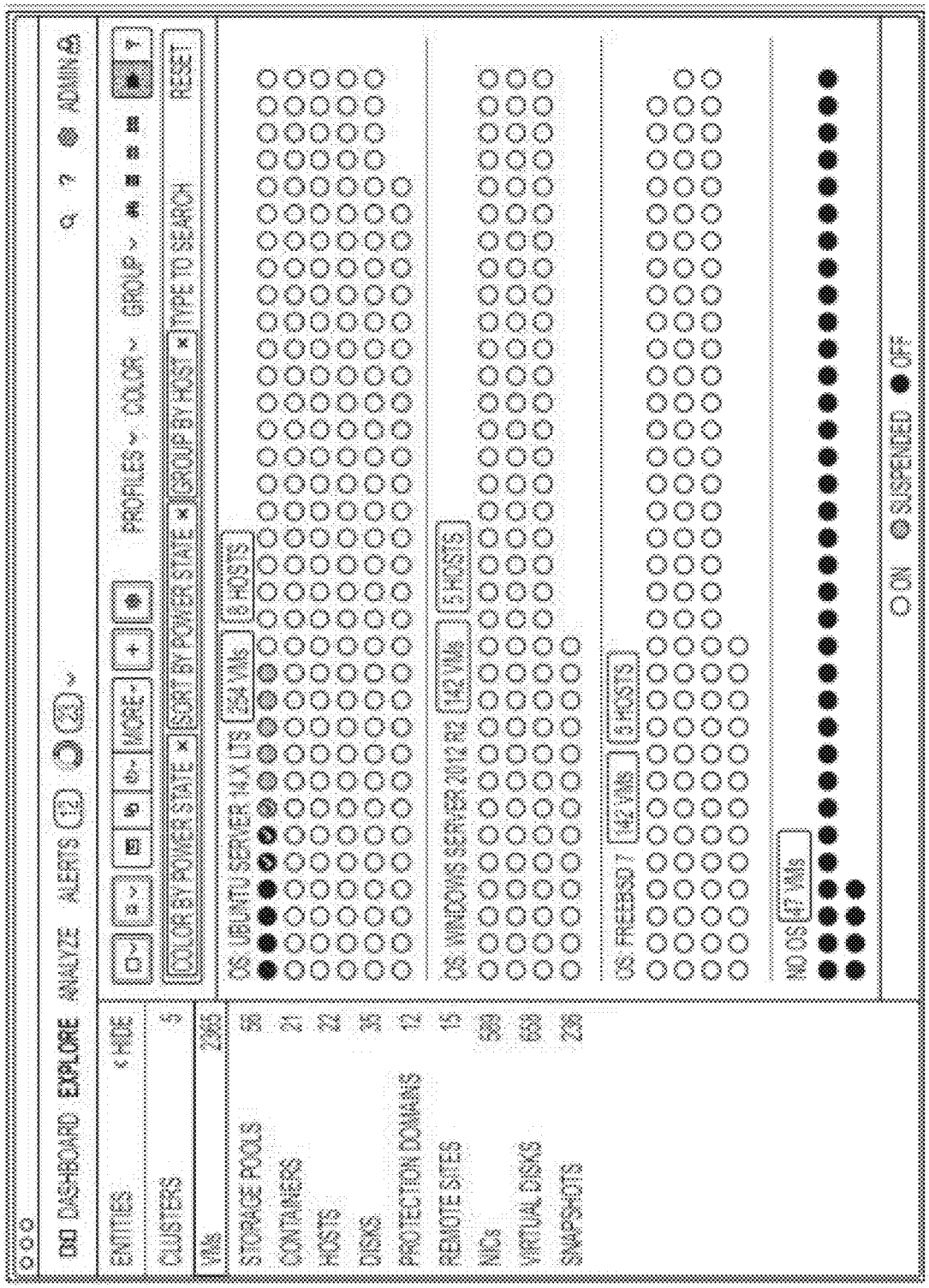
FIG. 14 illustrates a UI displaying a graphical overview representation of current state and other information for the selected and grouped VM-type entities.

FIG. 14 illustrates a UI displaying a graphical overview representation of current state and other information for host (machine) entities. Such a graphical representation may enable manual selection of displayed items. In the example of FIG. 14, a UI may display icons (e.g. a circle) for each of the hosts on which one or more VMs have been established, wherein the icons are sorted by power state. Each of the icons may further be colored or otherwise marked to indicate the corresponding entity's current power status, such as on, suspended, or off. In particular embodiments, the user may select one or more entities simply by clicking on the corresponding icon, which may be marked with a check to indicate the selection. In particular embodiments, once the user has finished selecting one or more entities, he or she may perform additional actions or apply labels to the selected entities.

Figure 15:
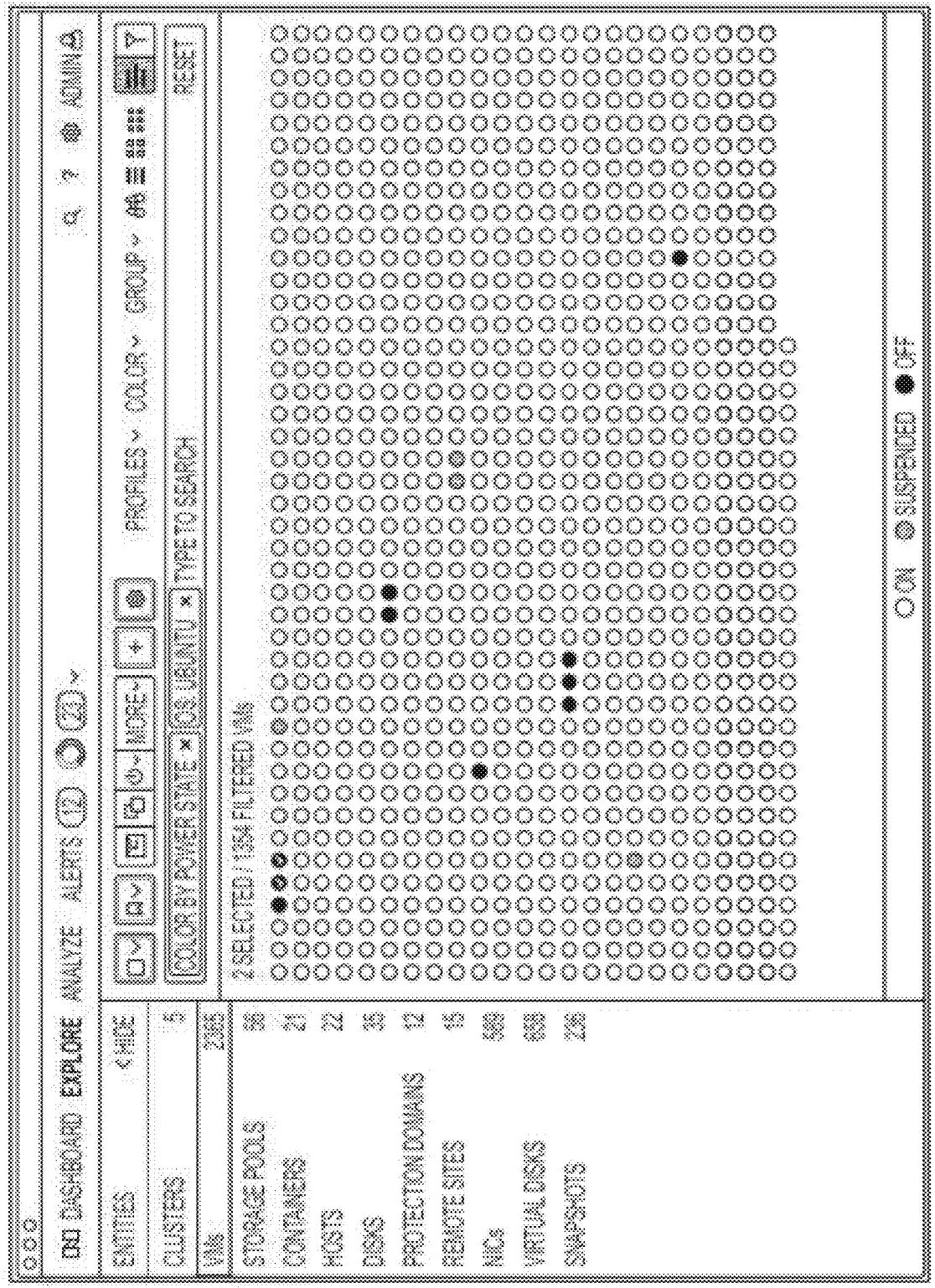
FIG. 15 illustrates a UI displaying a graphical overview representation of current state and other information for a filtered subset of the VM-type entities currently existing in the virtualization environment.

FIG. 15 illustrates a UI displaying a graphical overview representation of current state and other information for a filtered subset of the VM-type entities currently existing in the virtualization environment. This may be similar to the example of FIG. 14 however the VM-type entities are no longer grouped by an attribute such as host machine. The icons may be differentiated in appearance to indicate that entity's current status. The user may select one or more entities by clicking on the corresponding icons, and perform additional actions or apply labels to the selected entities.

In particular embodiments, in a hyper-converged scale-out infrastructure, the end user may be faced with the problem of performing one or more operations on a large number of entities that are hosted in a remote/distributed environment. To enable such operations, particular embodiments may provide a workflow or user interface that allows users to make a single request, which may be internally translated into localized requests that may then be performed on each of the individual nodes in the distributed environment.

In particular embodiments, to enable taking actions on different type of entities, special logic in the frontend may provide pre-validation feedback before given actions are made available to the user. As an example and not by way of limitation, a user may want to power off three VMs of different cluster versions, but one of the three versions that the user has selected may not support a power-off action. In particular embodiments, the UI may have special logic to notify the user that such an action cannot be performed on one of those three selected VMs. In particular embodiments, the workflow may enable the user to track the progress of their action in real time. In order to support a distributed environment, particular embodiments may provide resiliency for the request from the central location by resuming the request from the point of failure should the central location go down.

In particular embodiments, the workflow may provide a sophisticated visualization of the progress of these tasks by automatically converging the progress of individual tasks into a parent task for easy perception. As an example and not by way of limitation, a task structure may be as follows:

```
{
  "status": "kSucceeded",
  "internal_task": false,
  "cluster_uuid": "27f1b89f-8b56-458b-a082-fa8bf6c51452",
  "internal_opaque": "<bytes represent internal objects>",
  "logical_timestamp": 6,
  "deleted": false,
  "subtask_uuid_list": ["4af3a50f-a353-47bf-92a1-89431d5c5dab"],
  "component": "kPrismCentral",
  "start_time_usecs": 1455234405731588,
  "percentage_complete": 100,
  "canceled": false,
  "sequence_id": 7,
  "last_updated_time_usecs": 1455234408734287,
  "create_time_usecs": 1455234405635435,
  "operation_type": "kPrismFanout",
  "complete_time_usecs": 1455234408734299,
  "message": "",
  "uuid": "afbe1946-fcbe-45df-aa24-2b1693af8333"
}
```

In particular embodiments, users may be enabled to perform bulk operations in a vendor-agnostic, heterogeneous data center without tying the user to a particular hypervisor. In particular embodiments, this may simplify the data center operations with crash resistance and real time progress tracking. In particular embodiments, in addition to allowing the user to perform bulk actions from centralized location, users may be enabled to perform heterogeneous actions in the same action flow. As an example and not by way of limitation, the end user may make use of the user interface to both power on and power off thousands of VMs from a centralized location with a single request.

In particular embodiments, the workflow may use only one process thread throughout the process regardless the number of the target entities. Since most of the local jobs are expected done within 1 minute, the process is expected to complete within a short duration. In particular embodiments, the workflow may provide a five-minute maximum for all jobs to be done and synced back to the centralized location. In particular embodiments, if some jobs are not completed within five minutes, failure or error may be presumed, and so the process may be terminated in the centralized location, and the parent task may be marked as "failed" with a detailed reason attached.

Figure 16:
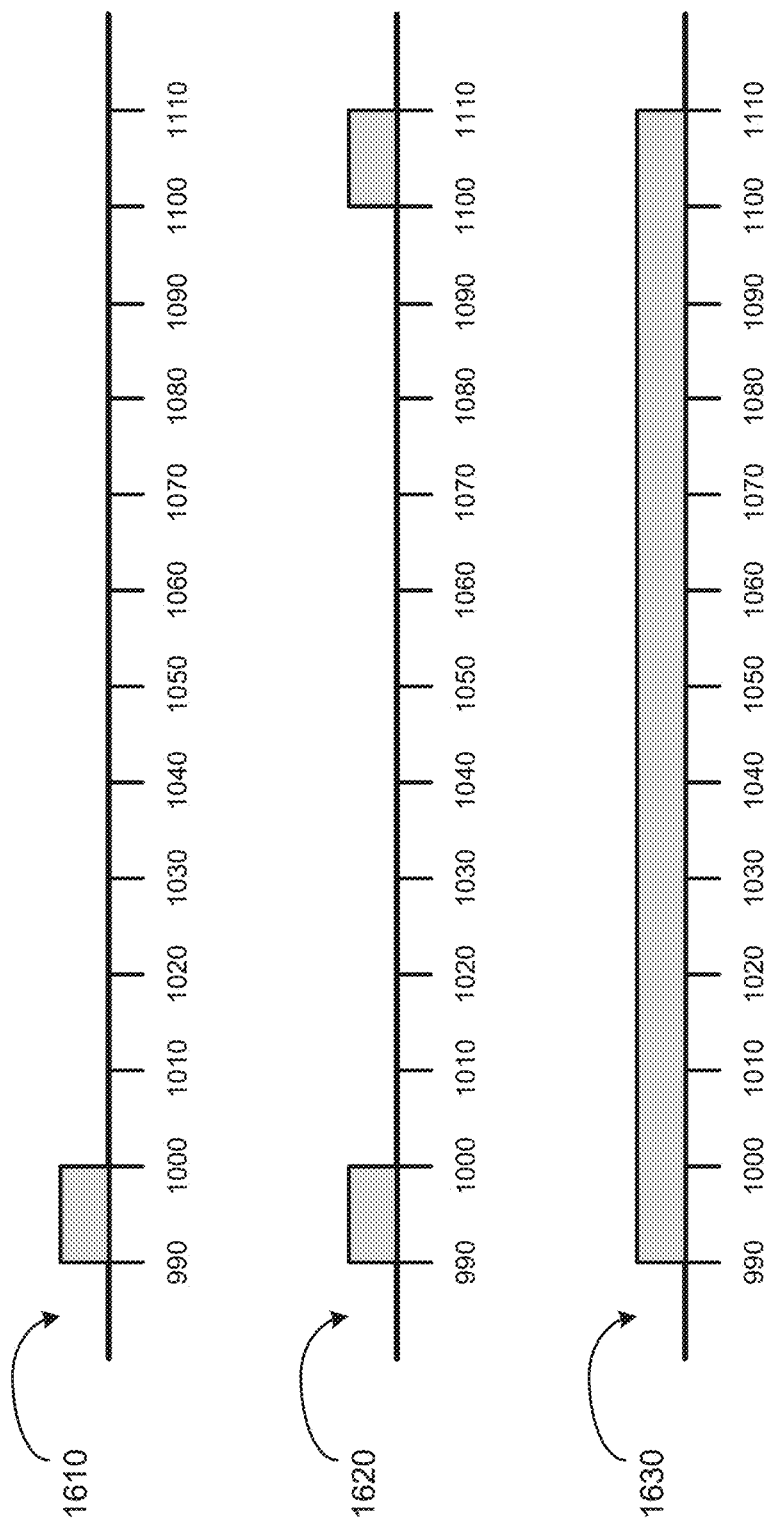
FIG. 16 illustrates an example of range-based replication according to some embodiments.

FIG. 16 illustrates an example of range-based replication according to some embodiments. Suppose initially the replica contained no changes, and then a change with the range [990 . . . 1000) is replicated. The replica may apply the change and account for it in the replication state. As shown by 1610, the replication state could be described by the map of the following ranges {990, 1000}.

Suppose now a change with the range [1100 . . . 1110) is replicated. The replica can apply the change and account for it in the replication state. As shown by 1620, the replication state could be described by the map of the following ranges {990, 1000}, {1100, 1110}.

Suppose now a change with the range [1000, 1100) got replicated. As this change is adjacent to the existing ranges, all ranges can now be merged into one range. As shown by 1630, the replication state could be described by the map of the following ranges {990, 1110}.

Thus, the range based replication state can represent replicated changes efficiently, and may be more precise than a "latest" timestamp value.

Entities in the database may be linked in a hierarchical manner using "parent" links. An entity may have any number of parents. For example, an entity with identifier "VM #3" could have a parent entity with identifier "Node #22," in which case the "VM #3" entity would have a parent link pointing to "Node #22" entity.

Figure 17:
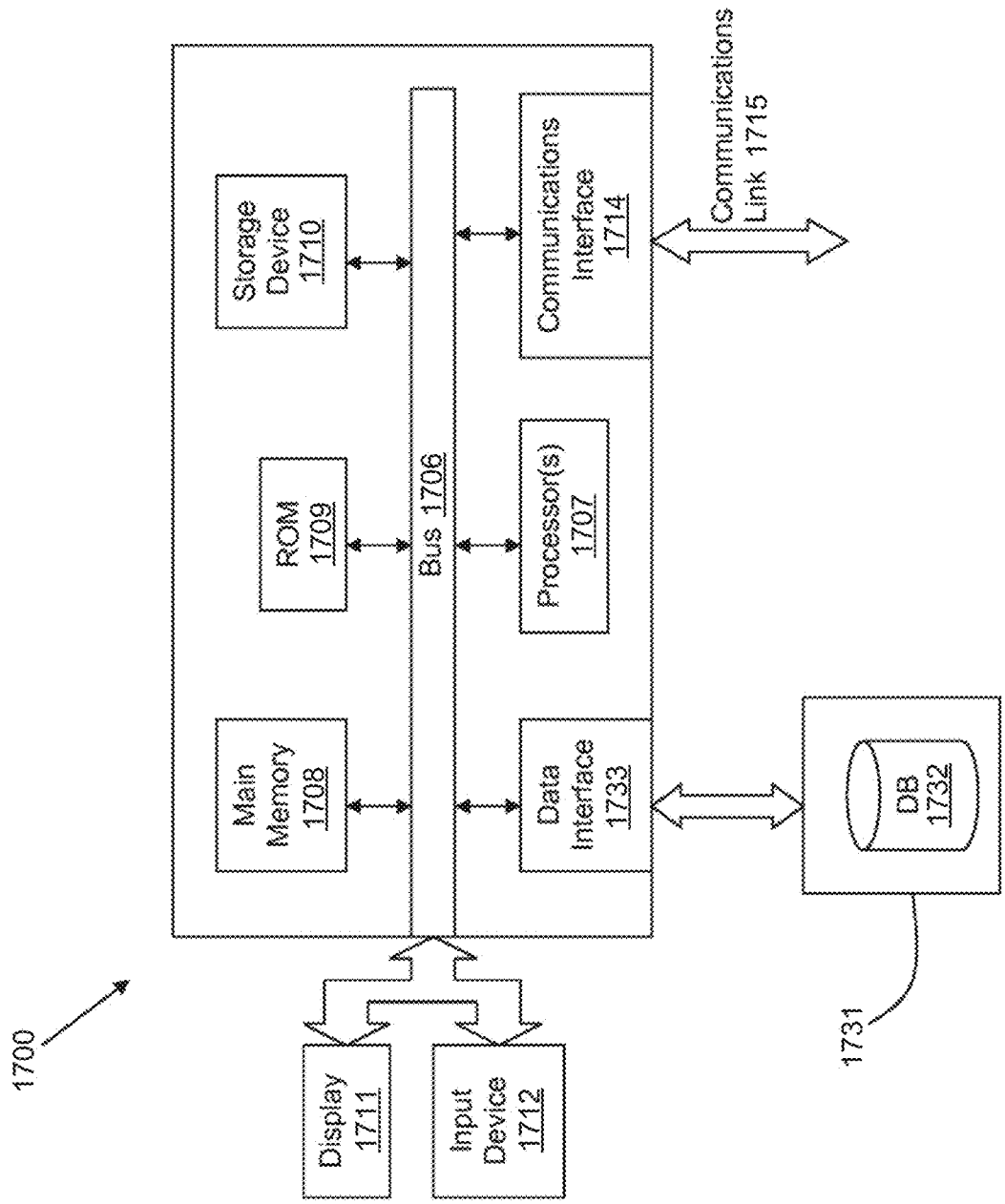
FIG. 17 illustrates a block diagram of a computing system suitable for implementing particular embodiments.

FIG. 17 is a block diagram of an illustrative computing system 1700 suitable for implementing particular embodiments. In particular embodiments, one or more computer systems 1700 may perform one or more steps of one or more methods described or illustrated herein. In particular embodiments, one or more computer systems 1700 may provide functionality described or illustrated herein. In particular embodiments, software running on one or more computer systems 1700 may perform one or more steps of one or more methods described or illustrated herein or provide functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

Computer system 1700 may include a bus 1706 (e.g., an address bus and a data bus) or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 1711 (e.g., CRT, LCD, LED), input device 1712 (e.g., keyboard, keypad, mouse, microphone). In particular embodiments, computer system 1700 may include one or more of any such components.

According to particular embodiments, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the invention. Thus, embodiments are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1707 for execution. Such a medium may take many forms, including but not limited to, nonvolatile media and volatile media. Non-volatile media includes, for example, optical or magnetic disks, such as disk drive 1710. Volatile media includes dynamic memory, such as system memory 1708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions to practice the invention is performed by a single computer system 1700. According to other embodiments, two or more computer systems 1700 coupled by communication link 1715 (e.g., LAN, PTSN, or wireless network) may perform the sequence of instructions required to practice the invention in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution. A database 1732 in a storage medium 1731 may be used to store data accessible by the system 1700 by way of data interface 1733.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    organizing, by a computing device, a plurality of entities in a virtualization environment into a plurality of shards, wherein the plurality of entities comprise a plurality of processing entities and at least one storage device, wherein a set of the plurality of processing entities is associated with a single shard from the plurality of shards, wherein the single shard corresponds to a single entity type;
    determining, by the computing device, an entity trail for the single shard, wherein the entity trail comprises a history of modifications made to one or more of the plurality of processing entities associated with the single shard;
    receiving, by the computing device, an update to a processing entity associated with the single shard, wherein the update corresponds to a client timestamp and the client timestamp is unique to the single shard; and
    updating, by the computing device, a time segment of the entity trail corresponding to the client timestamp with the update to the processing entity.

2. The method of claim 1, wherein time segments of the entity trail are determined by a pre-determined time period.

3. The method of claim 1, further comprising appending a reference to the update to the entity to a first time segment and a last time segment of the entity trail.

4. The method of claim 3, further comprising:
    receiving a read request for the first time segment or the last time segment; and
    updating the first time segment or the last time segment with the update to the entity.

5. The method of claim 1, further comprising:
    receiving a request for the selected time segment of the entity trail; and
    sending the updated version of the selected time segment.

6. The method of claim 1, wherein each entity of the plurality of entities corresponds to an entity-type node in an entity-relationship graph, wherein relationships between two or more entities are represented by edges between the entity-type nodes.

7. The method of claim 6, wherein each entity-type node further corresponds to one or more activity-type nodes.

8. The method of claim 7, wherein the activity-type nodes comprise action-type nodes, alert-type nodes, metric-type nodes, or attributes-type nodes.

9. The method of claim 1, wherein the plurality of processing entities comprise a plurality of virtual machines.

10. The method of claim 1, wherein the set of processing entities in the single shard are across multiple nodes.

11. The method of claim 1, wherein the at least one storage device is associated with at least one virtual disk, and wherein data associated with the plurality of processing entities is stored in the at least one storage device associated with the at least one virtual disk.

12. The method of claim 1, wherein each of the set of the plurality of processing entities in the single shard is of the single entity type.

13. A non-transitory computer readable memory storing computer program code to cause a computer to perform a method comprising:

organizing a plurality of entities in a virtualization environment into a plurality of shards, wherein the plurality of entities comprise a plurality of processing entities and at least one storage device, wherein a set of the plurality of processing entities is associated with a single shard from the plurality of shards, wherein the single shard corresponds to a single entity type;

determining an entity trail for the single shard, wherein the entity trail comprises a history of modifications made to one or more of the plurality of processing entities associated with the single shard;

receiving an update to a processing entity associated with the single shard, wherein the update corresponds to a client timestamp and the client timestamp is unique to the single shard; and updating a time segment of the entity trail corresponding to the client timestamp with the update to the processing entity.

14. The non-transitory computer readable memory of claim 13, wherein time segments of the entity trail are determined by a pre-determined time period.

15. The non-transitory computer readable memory of claim 13, further comprising appending a reference to the update to the entity to a first time segment and a last time segment of the entity trail.

16. The non-transitory computer readable memory of claim 15, wherein the method further comprises:

receiving a read request for the first time segment or the last time segment; and updating the first time segment or the last time segment with the update to the entity.

17. The non-transitory computer readable memory of claim 13, wherein the method further comprises:

receiving a request for the selected time segment of the entity trail; and sending the updated version of the selected time segment.

18. An apparatus comprising a processor executing programmed instructions stored on a memory to:

organize a plurality of entities in a virtualization environment into a plurality of shards, wherein the plurality of entities comprise a plurality of processing entities and at least one storage device, wherein a set of the plurality of processing entities is associated with a single shard from the plurality of shards, wherein the single shard corresponds to a single entity type;

determine an entity trail for the single shard, wherein the entity trail comprises a history of modifications made to one or more of the plurality of processing entities associated with the single shard;

receive an update to a processing entity associated with the single shard, wherein the update corresponds to a client timestamp and the client timestamp is unique to the single shard; and update a time segment of the entity trail corresponding to the client timestamp with the update to the processing entity.

19. The apparatus of claim 18, wherein each of the set of the plurality of processing entities is associated with the single entity type.

20. The apparatus of claim 18, wherein each of the plurality of processing entities is a virtual machine and the at least one storage device is associated with a virtual disk.

* * * * *